(12) United States Patent
Buettner et al.

(10) Patent No.: US 12,695,079 B2
(45) Date of Patent: Jul. 28, 2026

(54) MULTI-SPOT LASER-SUSTAINED PLASMA LIGHT SOURCE

(71) Applicant: KLA Corporation, Milpitas, CA (US)

(72) Inventors: Alexander Buettner, Weilburg (DE); Vahid Esfandyarpour, San Jose, CA (US); Tobias Mueller, Weilburg (DE)

(73) Assignee: KLA Corporation, Milpitas, CA (US)

( * ) Notice: Subject to any disclaimer, the term of this patent is extended or adjusted under 35 U.S.C. 154(b) by 95 days.

(21) Appl. No.: 18/760,929

(22) Filed: Jul. 1, 2024

(65) Prior Publication Data

US 2026/0005008 A1      Jan. 1, 2026

(51) Int. Cl.
| | |
|---|---|
| *H01J 65/00* | (2006.01) |
| *G02B 27/10* | (2006.01) |
| *G02B 27/12* | (2006.01) |
| *G02B 27/14* | (2006.01) |
| *H01J 61/02* | (2006.01) |

(52) U.S. Cl.
CPC .......... *H01J 65/00* (2013.01); *G02B 27/1086* (2013.01); *G02B 27/123* (2013.01); *G02B 27/14* (2013.01); *H01J 61/025* (2013.01)

(58) Field of Classification Search
CPC .... H01J 65/00; H01J 61/025; G02B 27/1086; G02B 27/123; G02B 27/14
See application file for complete search history.

(56) References Cited

U.S. PATENT DOCUMENTS

| | | | |
|---|---|---|---|
| 5,608,526 A | 3/1997 | Piwonka-Corle et al. | |
| 5,999,310 A | 12/1999 | Shafer et al. | |

| | | | |
|---|---|---|---|
| 6,297,880 B1 | 10/2001 | Rosencwaig et al. | |
| 7,525,649 B1 | 4/2009 | Leong et al. | |
| 7,705,331 B1 | 4/2010 | Kirk et al. | |
| 7,819,533 B2 * | 10/2010 | Suzuki .................. | H04N 9/315 353/102 |

(Continued)

FOREIGN PATENT DOCUMENTS

| | | |
|---|---|---|
| JP | 2011118108 A | 6/2011 |
| KR | 20120125571 A | 11/2012 |

(Continued)

OTHER PUBLICATIONS

Ministry of Intellectual Property, International Search Report and Written Opinion received in International Application No. PCT/US2025/035828, Oct. 28, 2025, 8 pages.

*Primary Examiner* — David A Vanore
(74) *Attorney, Agent, or Firm* — Suiter Swantz IP

(57) ABSTRACT

An LSP broadband light source is disclosed. The LSP broadband light source may include a pump source configured to generate a pump beam and one or more collimating optical elements configured to collimate the pump beam into a collimated pump beam. The light source may include one or more focusing optical elements and a beamsplitter located at a conjugate plane between the one or more collimating optical elements and the one or more focusing optical elements. The light source may include a gas containment structure. The beamsplitter may be configured to split the collimated pump beam into a set of pump beamlets, wherein the one or more focusing optical elements are configured to focus the set of pump beamlets to a set of focus positions within the gas to generate multiple plasma regions at the different focus positions.

29 Claims, 24 Drawing Sheets

(56)                    References Cited

U.S. PATENT DOCUMENTS

| | | | |
|---|---|---|---|
| 7,957,066 B2 | 6/2011 | Armstrong et al. | |
| 8,259,771 B1* | 9/2012 | Shchemelinin | H01J 61/54 |
| | | | 372/55 |
| 9,506,871 B1 | 11/2016 | Flock | |
| 9,609,732 B2 | 3/2017 | Smith | |
| 9,723,703 B2* | 8/2017 | Bezel | H01J 61/302 |
| 9,865,447 B2 | 1/2018 | Chuang et al. | |
| 10,032,619 B2 | 7/2018 | Chuang et al. | |
| 10,714,327 B2* | 7/2020 | Bezel | G01N 23/04 |
| 10,806,016 B2 | 10/2020 | Khodykin et al. | |
| 10,811,158 B1 | 10/2020 | Chen et al. | |
| 11,121,521 B2* | 9/2021 | Bezel | F21V 9/06 |
| 11,262,591 B2 | 3/2022 | Bezel et al. | |
| 2006/0028732 A1* | 2/2006 | Somani | A61F 9/00814 |
| | | | 359/619 |
| 2007/0002465 A1 | 1/2007 | Chuang et al. | |
| 2009/0109417 A1* | 4/2009 | Tanitsu | G03F 7/70116 |
| | | | 430/5 |
| 2011/0181191 A1 | 7/2011 | Smith et al. | |
| 2011/0291566 A1* | 12/2011 | Bezel | G21B 1/23 |
| | | | 315/111.21 |
| 2013/0001438 A1* | 1/2013 | Bezel | H01J 65/042 |
| | | | 250/492.1 |
| 2013/0003384 A1* | 1/2013 | Bezel | G01J 3/021 |
| | | | 362/276 |
| 2013/0114085 A1 | 5/2013 | Wang et al. | |
| 2015/0008335 A1* | 1/2015 | Bykanov | G03F 7/70916 |
| | | | 250/428 |
| 2015/0049778 A1* | 2/2015 | Shchemelinin | G02B 27/1006 |
| | | | 372/76 |
| 2015/0168847 A1* | 6/2015 | Solarz | H01S 3/225 |
| | | | 372/76 |
| 2015/0279628 A1* | 10/2015 | Wilson | H01J 37/32339 |
| | | | 250/430 |
| 2015/0282288 A1* | 10/2015 | Bezel | H01J 61/302 |
| | | | 250/504 R |
| 2015/0333471 A1* | 11/2015 | Chimmalgi | G02B 6/4296 |
| | | | 313/111 |
| 2020/0150445 A1* | 5/2020 | Bezel | H01S 3/0071 |
| 2022/0187610 A1 | 6/2022 | Bezel et al. | |

FOREIGN PATENT DOCUMENTS

| | | |
|---|---|---|
| KR | 20160137607 A | 11/2016 |
| WO | 2024072774 A1 | 4/2024 |

\* cited by examiner

702 ⟍

704 ⟍

706 ⟍

712

Single

Double

Multiple

MULTI-SPOT LASER-SUSTAINED PLASMA LIGHT SOURCE

TECHNICAL FIELD

The present disclosure generally relates to plasma-based broadband light sources, and, more particularly, to a high-brightness laser-sustained (LSP) broadband light source with beam-splitting optics for generating multiple plasma regions.

BACKGROUND

Laser-sustained plasma (LSP) light sources are widely used in broadband inspection tools for use in semiconductor inspection and imaging. Generally, near-Infrared (NIR) Continuous Wave (CW) pump laser light is focused to a gas-containing vessel, where a plasma is ignited and sustained by absorption of the pump laser radiation. This vessel may be a lamp (e.g., glass bulb with or without electrodes used for plasma ignition), a cell (e.g., optomechanical assembly with transparent walls to allow laser and plasma radiation in and out of the cell), or a chamber (e.g., metal vessel with transparent windows for laser light input and plasma light output), or similar assembly.

Current plasma pump optics consist of a laser light source and focusing optics in order to generate a spot in a bulb, cell, or chamber to create and sustain a plasma spot. Those optics are either circular symmetric with same pump numerical aperture (NA) or anamorphic with different pump NAs in perpendicular directions. Additional description of anamorphic plasma pump system and corresponding applications is provided in U.S. Pat. No. 9,865,447B2 and U.S. Pat. No. 10,032,619B2, which are incorporated herein by reference in their entirety.

The laser light source can possess high beam quality and, thus, be configured in transversal single mode (Gaussian beam shape) or a multimode laser source having higher order transversal modes. Both systems can also be coupled into either a single or multimode fiber and with the fiber ends being used as light sources. In addition, such LSP broadband light sources may include some aspherical optical elements to fill the illumination pupil of the system more uniformly or with a different non-Gaussian shape in order to increase the brightness of the plasma. Such arrangements are described in U.S. Pat. No. 11,262,591B2 and U.S. Patent Publication No. 2022/0187610A1, which are incorporated by reference in their entirety.

In all these cases, a single focal spot is used to pump the plasma. The intensity distribution of the focal spot depends on the number of transversal modes of the light source, the numerical aperture, the light distribution in the pupil, and aberrations of the optical system and the bulb. One disadvantage of the prior approaches is that they create only a single focal spot for pumping the plasma. Therefore, it would be desirable to provide an LSP broadband light source that overcomes the limitations outlined above.

SUMMARY

A laser-sustained plasma broadband light source is disclosed. In some aspects, the laser-sustained plasma broadband light source includes: a pump source configured to generate a pump beam; one or more collimating optical elements configured to collimate the pump beam into a collimated pump beam; one or more focusing optical elements; a beamsplitter located at a conjugate plane between the one or more collimating optical elements and the one or more focusing optical elements; and a gas containment structure configured to contain a gas, wherein the beamsplitter is configured to split the collimated pump beam into a plurality of pump beamlets, wherein the one or more focusing optical elements are configured to focus the plurality of pump beamlets to a plurality of focus positions within the gas to generate a plurality of plasma regions at the different focus positions, wherein a respective plasma region is generated at a respective focus position. In additional and/or alternative embodiments, a beam-shaper may be used in place of the beam-splitter to produce a smooth intensity distribution within the gas containment structure.

An optical characterization system is disclosed. The optical characterization system includes: a laser-sustained broadband light source including: a pump source configured to generate a pump beam; one or more collimating optical elements configured to collimate the pump beam into a collimated pump beam; one or more focusing optical elements; a beamsplitter located at a conjugate plane between the one or more collimating optical elements and the one or more focusing optical elements; and a gas containment structure configured to contain a gas, wherein the beamsplitter is configured to split the collimated pump beam into a plurality of pump beamlets, wherein the one or more focusing optical elements are configured to focus the plurality of pump beamlets to a plurality of focus positions within the gas to generate a plurality of plasma regions at the different focus positions, wherein a respective plasma region is generated at a respective focus position; and a light collector element configured to collect at least a portion of broadband light emitted from the plasma; a set of illuminator optics configured to direct the broadband light from the light collector element to one or more samples; a detector assembly; and a set of projection optics configured to receive illumination from the surface of the one or more samples and direct the illumination from the one or more samples to the detector assembly. In additional and/or alternative embodiments, a beam-shaper may be used in place of the beam-splitter to produce a smooth intensity distribution within the gas containment structure.

A method is disclosed. The method includes generating a beam of pump illumination; collimating the beam of pump illumination into a collimated pump beam; splitting the collimated pump beam into a plurality of pump beamlets with one or more beamsplitters; focusing the plurality of pump beamlet to a plurality of focus positions within a gas contained within a gas containment structure to generate a plurality of plasma regions at different focus positions, wherein a respective plasma region is generated at a respective focus position; and collecting at least a portion of broadband light emitted from the plurality of plasma regions and delivering the portion of the broadband light to one or more optical elements external to the gas containment structure. In additional and/or alternative embodiments, a beam-shaper may be used in place of the beam-splitter to produce a smooth intensity distribution within the gas containment structure.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure.

Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to an LSP broadband light source with a plasma shape optimized for distinct applications. The plasma shape of the LSP broadband light source may be controlled by pump optics to create arbitrary and tailorable intensity distributions in the focal region of a plasma bulb, cell, or chamber. Embodiments of the present disclosure may generate a laser-sustained plasma by multiple laser focal spots at once. This may be achieved by adding a beamsplitter-type (diffractive or refractive) optical element into a conjugate pupil of the illumination optical system.

Figure 1:
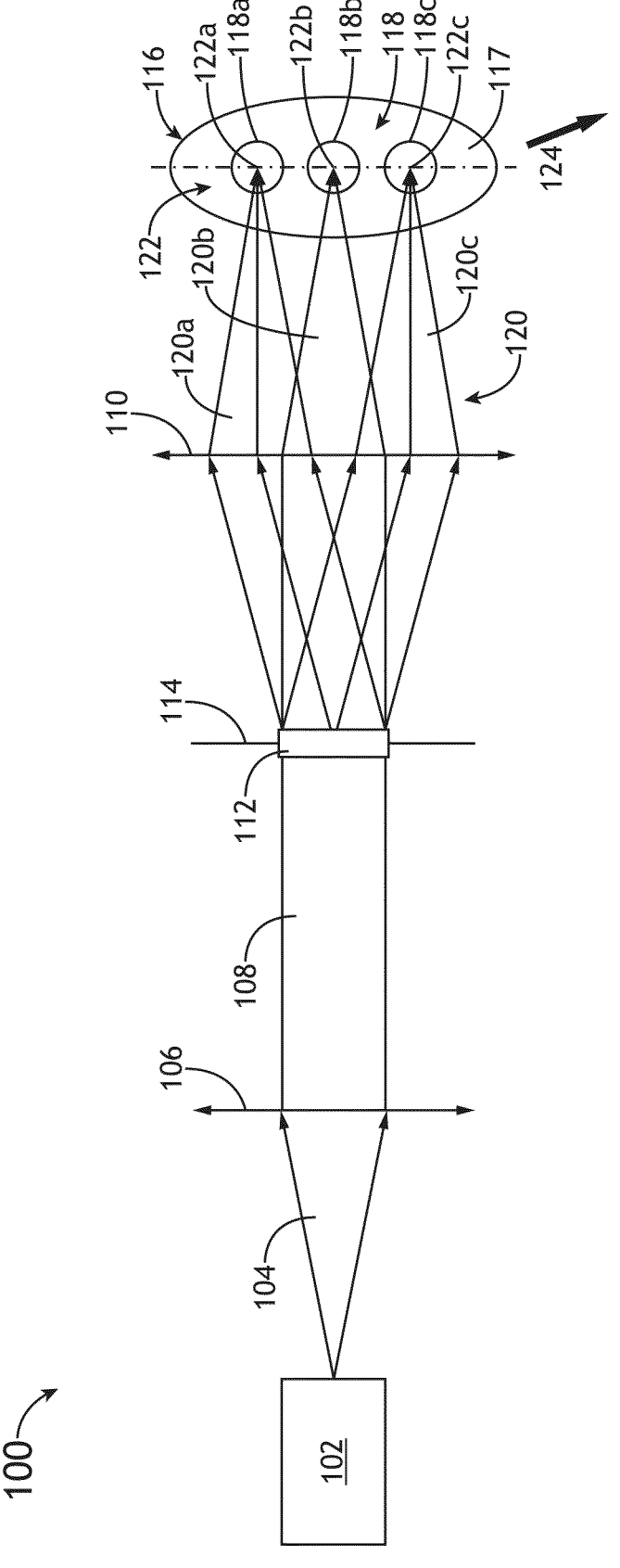
FIG. 1 illustrates a conceptual view of LSP broadband light source including multiple plasma regions generated by a beam-splitter, in accordance with one or more embodiments of the present disclosure.

FIG. 1 illustrates a simplified schematic view of a LSP broadband light source 100, in accordance with one or more embodiments of the present disclosure. In embodiments, the broadband light source 100 includes a pump source 102 configured to generate a pump beam 104 and one or more collimating optical elements 106 configured to collimate the pump beam 104 into a collimated pump beam 108. The light source 100 may include one or more focusing optical elements 110. In embodiments, the light source 100 includes a beamsplitter 112 located at a conjugate plane 114 between the one or more collimating optical elements 106 and the one or more focusing optical elements 110. In embodiments, the light source 100 includes gas containment structure 116 configured to contain a gas 117 for generating plasma regions 118. In embodiments, the beamsplitter 112 is configured to split the collimated pump beam 108 into a set of pump beamlets 120 (e.g., 120a, 120b, 120c). In embodiments, the one or more focusing optical elements 110 are configured to focus the set of pump beamlets 120 to a set of focus positions 122 (e.g., 122a-122c) within the gas 117 to generate a set of plasma regions 118 (e.g., 118a-118c) at the different focus positions. In this regard, a respective plasma region is generated at a respective focus position. For example, plasma region 118a is generated at focus position 122a, plasma region 118b is generated at focus position 122b, plasma region 118c is generated at focus position 122c, and so on. It is noted that the number of pump beamlets and plasma regions is not limited to three which is provided merely for illustration purposes. The plasma regions 118 may emit broadband light 124 suitable for use in one or more downstream applications such as, but not limited to, inspection or metrology.

Figure 2A:
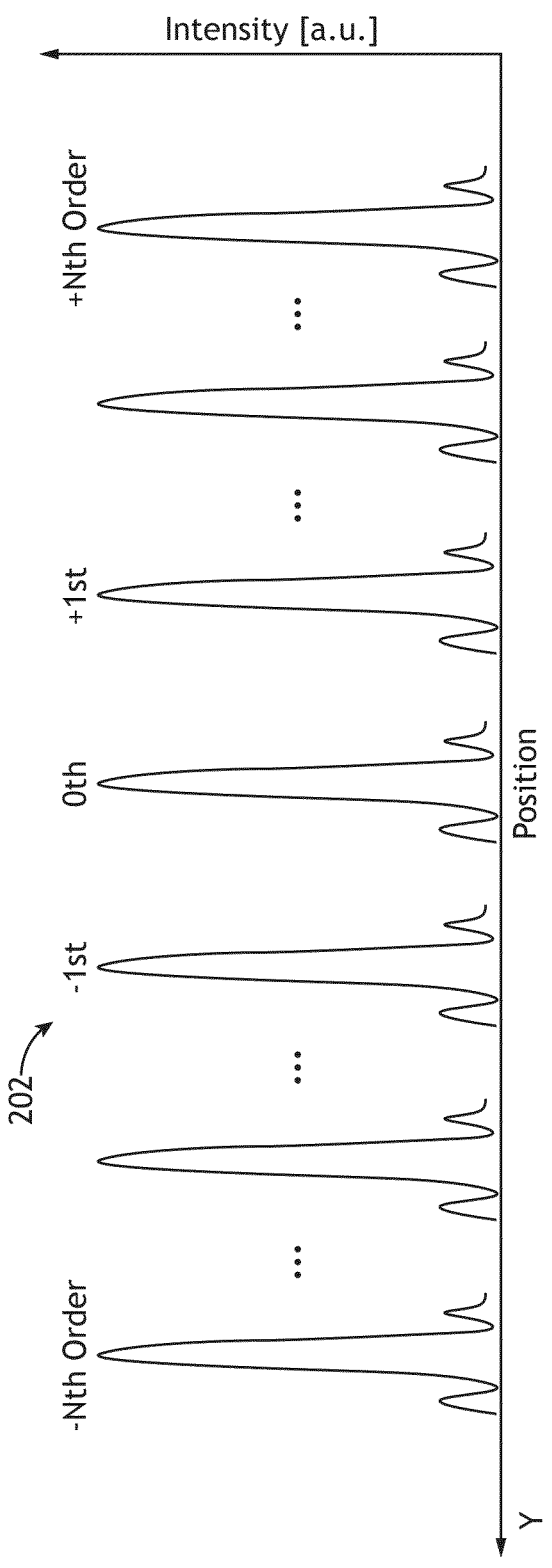
FIG. 2A illustrates a graph of illumination intensity as a function of position within the gas containment structure of the LSP broadband light source showing a series of equal-intensity illumination spots, in accordance with one or more embodiments of the present disclosure.
Figure 2B:
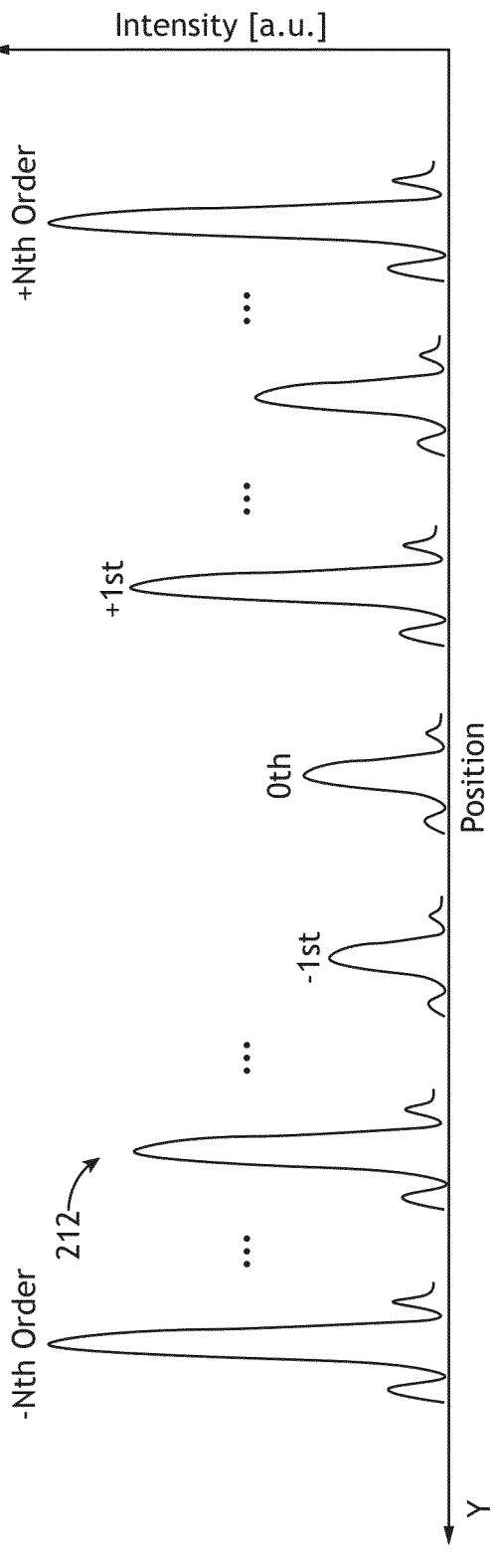
FIG. 2B illustrates a graph of illumination intensity as a function of position within the gas containment structure of the LSP broadband light source showing a series of unequal-intensity illumination spots, in accordance with one or more embodiments of the present disclosure.

In embodiments, the beamsplitter 112 is a diffractive beamsplitter. For example, a diffractive beamsplitter may generate the set of pump beamlets 120 (e.g., beamlets 120a-120c) corresponding to a set of diffraction orders generated by the diffractive beamsplitter. For example, as shown in FIG. 2A, the diffractive beamsplitter 112 may be configured to generate a series 202 of diffraction orders having the same or approximately the same intensity. The light from the diffraction orders 202 may be focused to generate the set of corresponding plasma regions 118 which may have plasma sizes and brightness which are the same or approximately the same. By way of another example, as shown in FIG. 2B, the diffractive beamsplitter 112 may generate a series 212 of diffraction orders having varying intensity. The light from the diffraction orders 212 may be focused to generate the set of corresponding plasma regions 118 which may have plasma sizes and brightness that differ as a function of position.

In embodiments, the beamsplitter is a reflective beamsplitter. For example, a patterned mirror may be used to selectively reflect illumination to form beamlets 120 and corresponding focus points 122 within the gas containment structure 116. By way of another example, the reflective beamsplitter may include a reflective micro-mirror array to selective reflect illumination to form beamlets 120 and corresponding focus points 122 within the gas containment structure 116.

In embodiments, the beamsplitter is a refractive beamsplitter. For example, the beamsplitter may include a refractive adaptive micro-lens array.

Figure 2C:
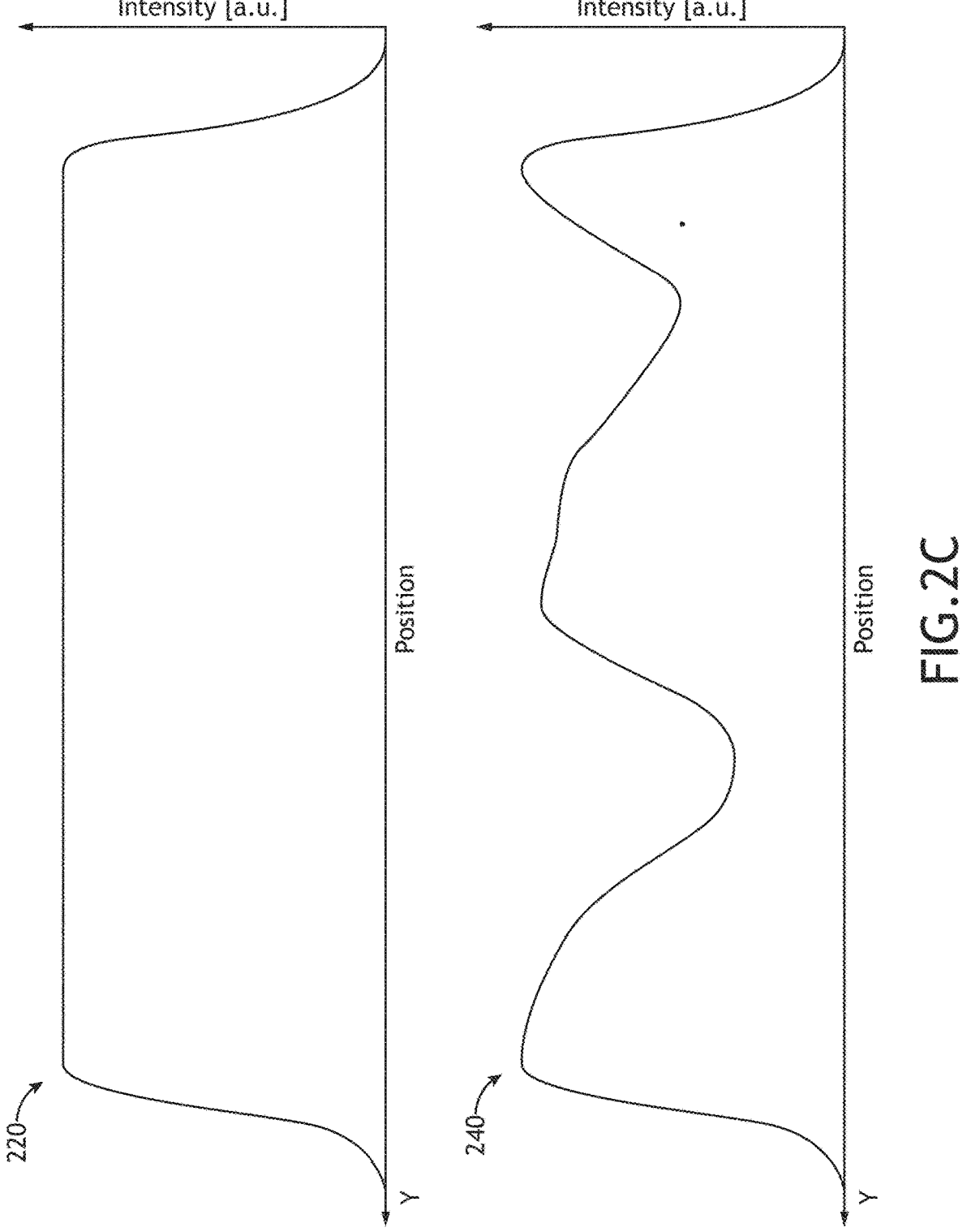
FIG. 2C illustrates graphs of illumination intensity as a function of position within the gas containment structure of the LSP broadband light source showing smooth intensity distributions, in accordance with one or more embodiments of the present disclosure.

While much of the present disclosure focuses on the implementation of a beamsplitter 112 within system 100, this configuration should not be interpreted as a limitation on the scope of the present disclosure. It is noted that any number of beam conditioning optics may be utilized in place of beamsplitter 112 within system 100. In additional and/or alternative embodiments, the beamsplitter 112 may be replaced with a beam-shaper to generate a smooth light distribution within the gas containment structure 116. For example, the beam-shaper may be used to produce a flat-top, or top-hat, distribution void of sharp intensity peaks. Any number of intensity distributions may be implemented. FIG. 2C depicts examples of smooth intensity distributions 220, 240 which may be implemented by a beam-shaper (in place of the beamsplitter 112). For example, intensity distribution 220 is a smooth flat-top curve which would envelope the distinct diffraction orders created by a diffractive beamsplitter. By way of another example, intensity distribution 240 is a smooth flat-top curve which would envelope the distinct diffraction orders, of different magnitude, created by a diffractive beamsplitter. In the case of a beam-shaper, in embodiments, the beam-shaper may include a diffractive beam-shaper (e.g., diffractive optical element (DOE)). In additional embodiments, the beam-shaper may include a reflective or refractive beam-shaper with a smooth aspheric or freeform topography.

Figure 3:
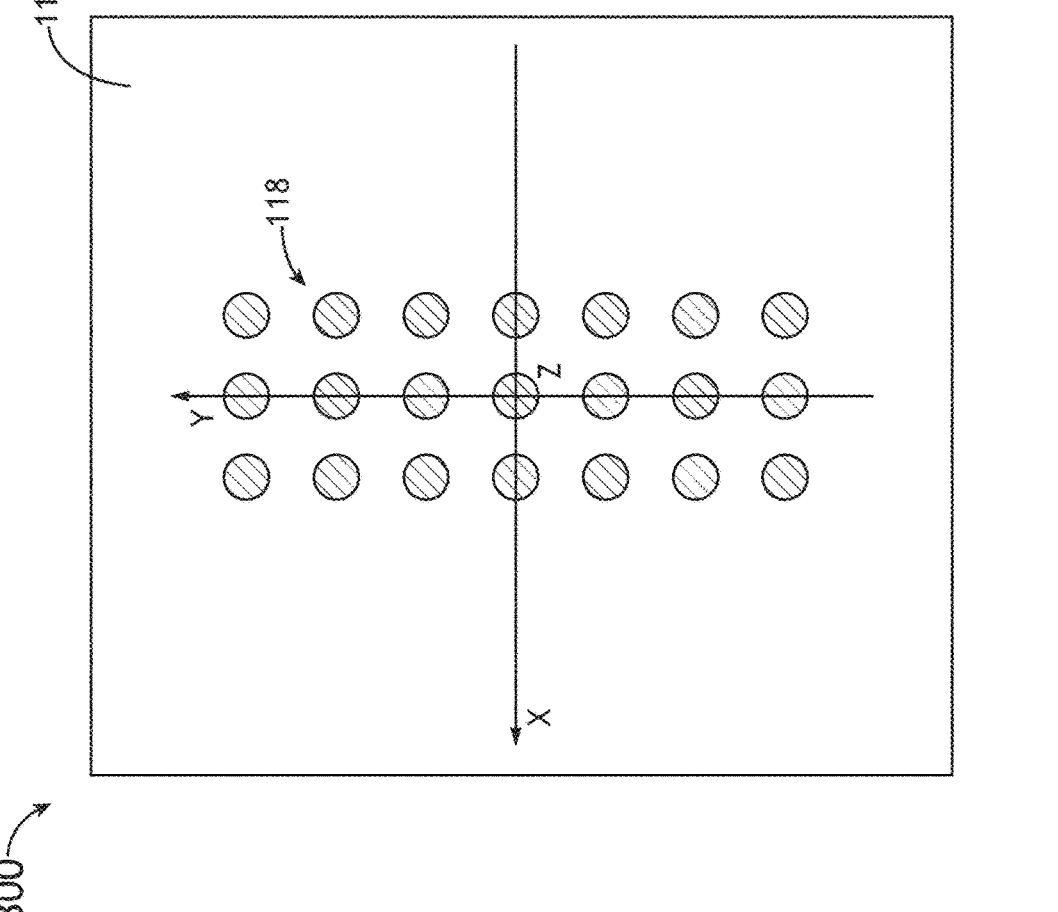
FIG. 3 illustrates a conceptual view of an array of plasma regions generated by the beam-splitter of the LSP broadband light source, in accordance with one or more embodiments of the present disclosure.

FIG. 3 illustrates a conceptual view 300 of an array of plasma regions 118. In this example, the beamsplitter 112 may generate a three-dimensional array of plasma regions 118 distributed within the gas containment structure 116. In embodiments, the regions 118 may have the same power content. In embodiments, the regions 118 may have different power content to allow better optimization of the plasma shape.

Multiple grating orders or deflection angles may be created out of a single incoming beam 108 and each of those orders may appear as spots (PSFs) in the focal plane r following focusing by focusing optics 110. Each of those grating orders may generate a focus spot at another location in the focal plane inside the gas containment structure 116. Additionally, the relative power content in the different orders can be adjusted by a selected beamsplitter element design, allowing for arbitrary spot distributions to create an extended plasma. In this way, the plasma shape may be selected and generated according to the needs of a corresponding application. For example, the size of the uniform plasma diameter may be tailored to achieve the best coupling efficiency into additional coupling optics of the measurement device, following the light source device. Some measurement devices require a very small and very bright spot because they need a small etendue, while others require a larger spot because they need a large etendue.

In embodiments, the relative power distribution within the different regions 118 may not be linearly correlated to the plasma shape. For example, one or more algorithms may be implemented to define the relative power distributions in a desired manner (e.g., optimized). For instance, the relative power distributions within the different regions 118 may be iteratively optimized when feeding the optical ray bundles to an extensive plasma model, whereby the Nth iteration of the plasma shape may be compared to the desired plasma distribution with the relative power distributions adjusted accordingly.

Figure 4:
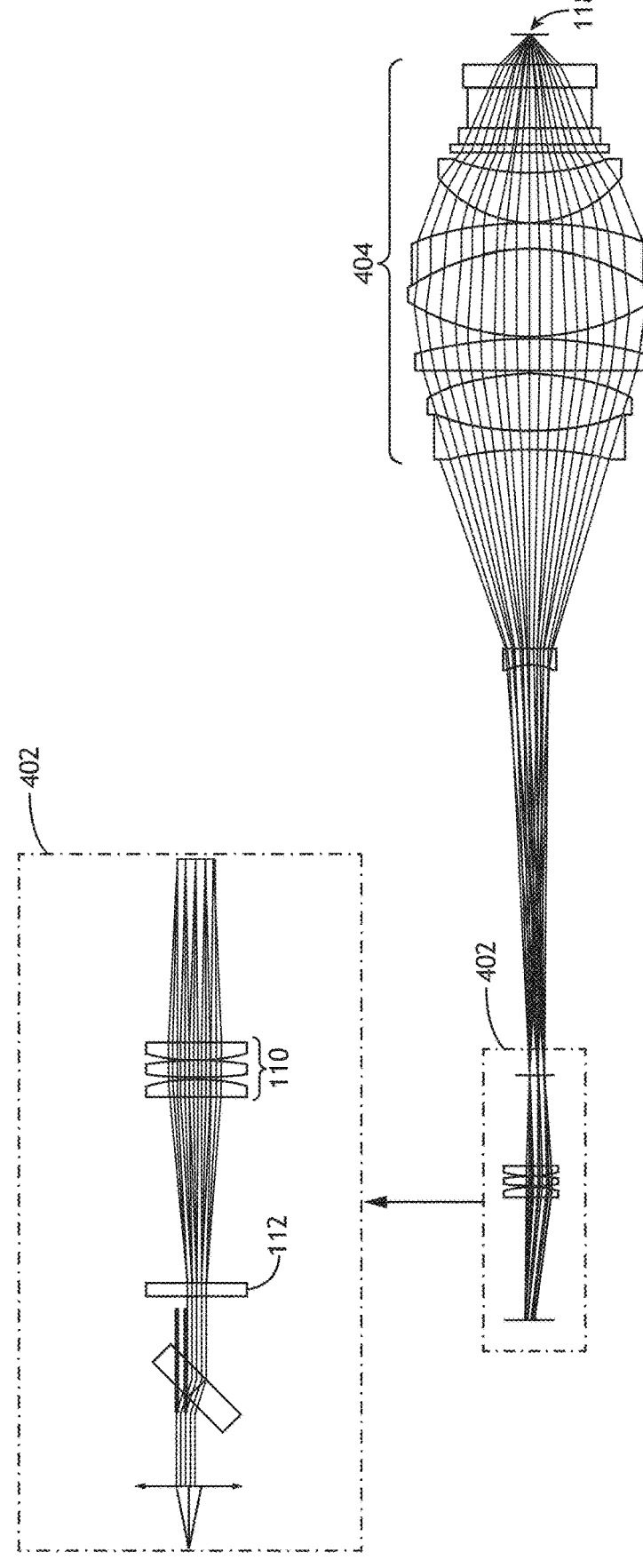
FIG. 4 illustrates a schematic view of a plasma pump optical configuration for the LSP broadband light source, in accordance with one or more embodiments of the present disclosure.

FIG. 4 illustrates a plasma pump optical configuration 400 for system 100, in accordance with one or more embodiments of the present disclosure. In this example, the laser spots are generated in a first, beamsplitter module 402. In embodiments, the generated spots are re-imaged to the locations of the regions 118 within gas containment chamber by a high NA objective 404. In this example, the system maintains flexibility and the beamsplitter module 402 and the objective 404 may be exchanged independently.

Figure 5:
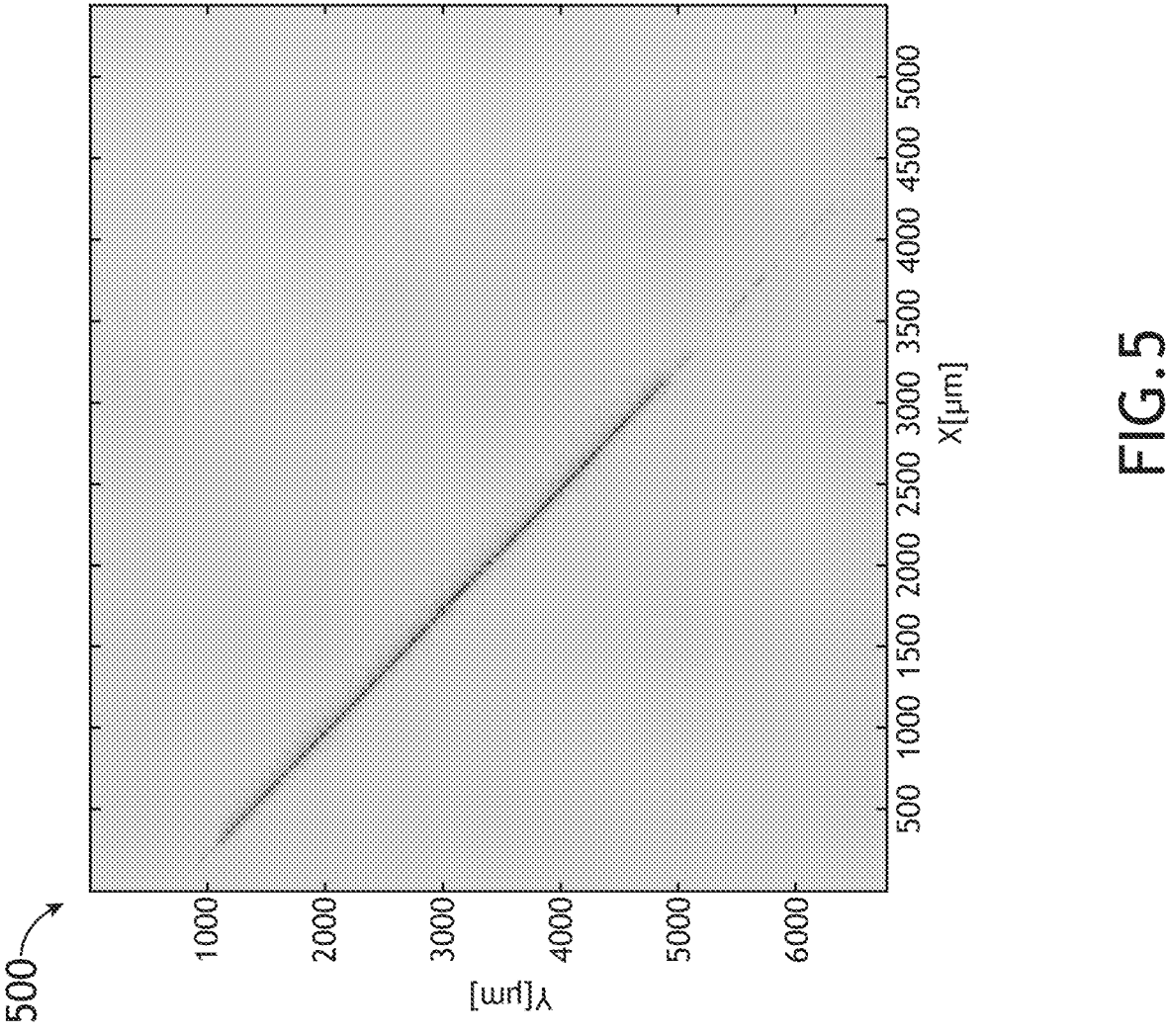
FIG. 5 illustrates an implementation of a laser line including multiple spots for use in the LSP broadband light source, in accordance with one or more embodiments of the present disclosure

FIG. 5 illustrates an image 500 of an implementation of a laser line including multiple spots for use in the LSP source 100, in accordance with one or more embodiments of the present disclosure. In this example, a laser line formed from 101 spots has been generated. The laser line was generated using a 1064 nm fiber laser with a 50 mm collimation lens and 40 mm spherical lens.

Figure 6A:
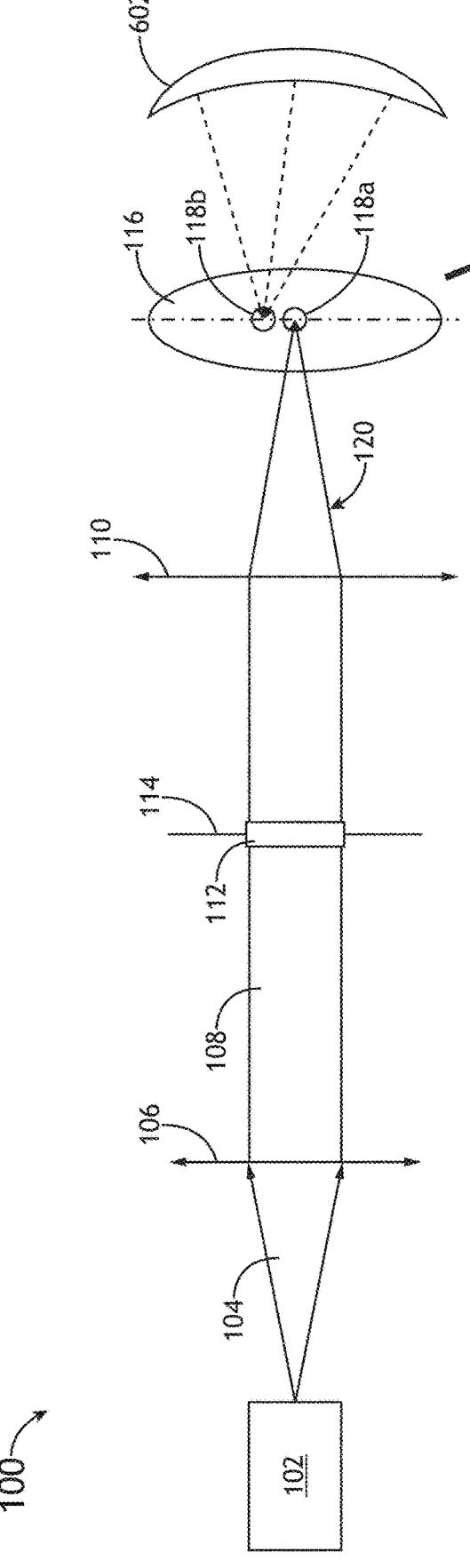
FIGS. 6A-6C illustrate the implementation of reflective optics for producing multiple spots within the gas containment structure, in accordance with one or more embodiments of the present disclosure.
Figure 6B:
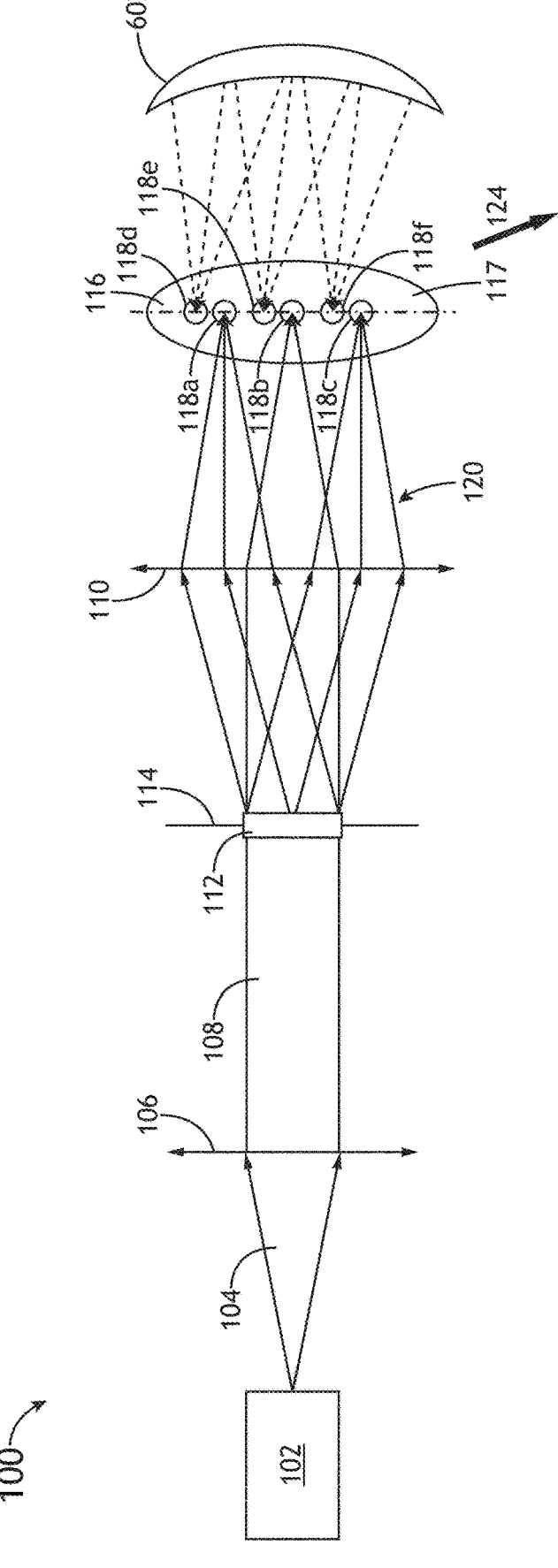
Figure 6C:
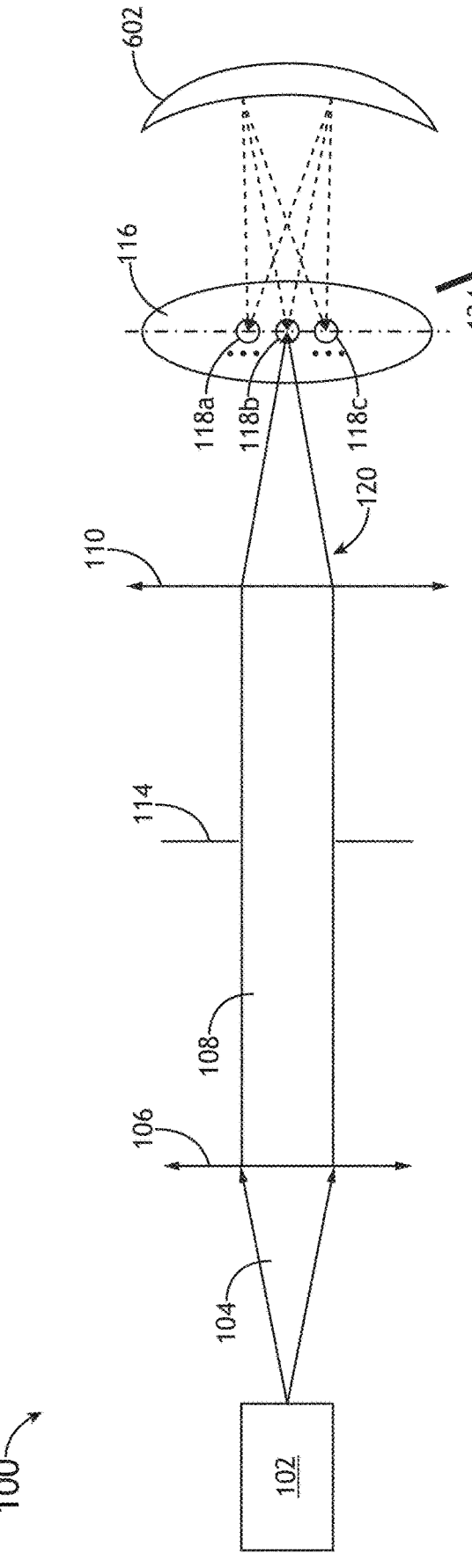

It is noted that the system 100 is not limited to the use of diffractive optics for producing multiple plasma regions within the gas containment structure 116. FIGS. 6A-6C illustrate the implementation of reflective optics for producing multiple spots within the gas containment structure 116, in accordance with one or more embodiments of the present disclosure. As shown in FIG. 6A, a mirror 602 may be implemented to reflect back the non-absorbed portion of the beam 108 at a position within the gas containment structure 116 that is offset from the focus of the first region 118a, thereby creating a second region 118b at a different location. The second region 118b may have characteristics (e.g., size, power) which are different from the first region 118a based on the focusing conditions of the mirror 602. As shown in FIG. 6B, this concept may be extended to multiple beams created with beamsplitter 112. In this example, the mirror 602 may form new regions 118d, 118e, 118f for each corresponding region 118a, 118b, 118c. Each new spot that is generated from the reflected beam may have completely different focusing conditions and power, and by changing the focusing condition for this reflected-back beam, the plasma size and uniformity may be tailored, and the plasma stability may be improved.

As shown in FIG. 6C, mirror 602 may comprise a beam-splitting or beam-shaping mirror. In this example, the beam-splitting or beam-shaping mirror 602 may be configured to produce multiple light orders or apply one or more beam-shaping functions to the illumination. In this example, multiple spots may be created without the use of beamsplitter 112. The mirror 602 itself may split the beam 108 and generate multiple spots of illumination and, thus, plasma regions 118 within the gas containment structure 116. For example, the mirror 602 may be a microstructure mirror configured to generate two or more orders of light within the gas containment structure 116. In this regard, the microstructured mirror may apply a beam-shaping function to the light reflected into the gas containment structure 116. In additional embodiments, the beam-splitting/beam-shaping mirror 602 may also be combined with the beam-splitter 112 (or beam-shaper) within the same optical system.

In embodiments, the focusing functions and diffracting functions of system 100 are not limited to separate optical components. For example, one or more focusing elements 110 and the beamsplitter 112 may be replaced with one or more lenses with diffractive lenses. By way of another example, one or more focusing elements 110 and the beamsplitter 112 may be replaced with one or more meta lenses. In embodiments, the one or more focusing elements 110 and the beamsplitter 112 may be replaced with a diffractive element with focusing functionality. Such an arrangement reduces the number of optical components in the system and allows for a more compact optical setup.

Figure 7A:
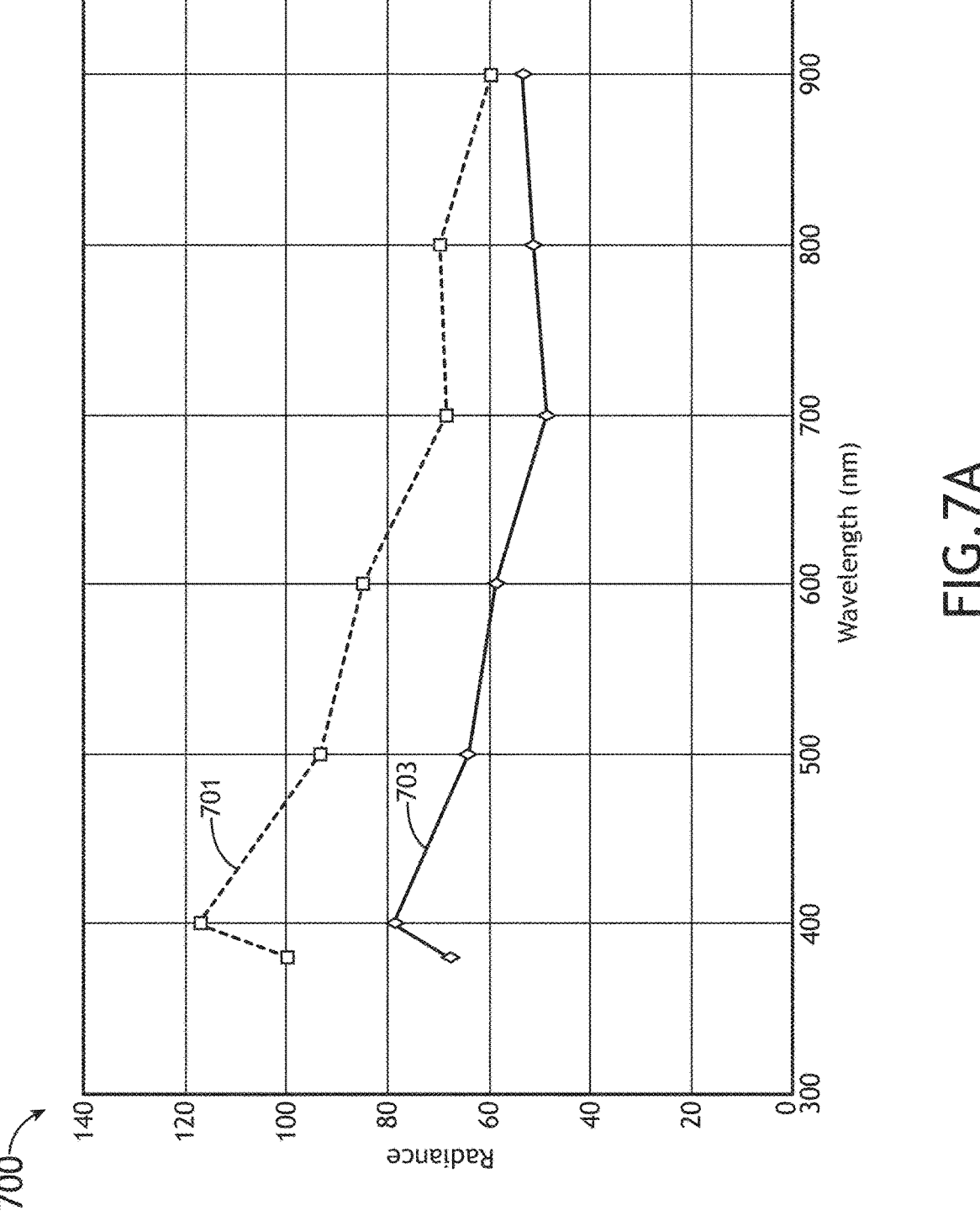
FIG. 7A illustrates a graph depicting measurement data obtained from an LSP source, in accordance with one or more embodiments of the present disclosure.

FIG. 7A illustrates graph 700 depicting measurement data obtained from an LSP source, in accordance with one or more embodiments of the present disclosure. Data set 701 shows radiance as a function of wavelength for an LSP source with a reflector (such as mirror 602), while data set 703 shows radiance as a function of wavelength for the same LSP source without a reflector. A noticeable radiance difference is observed across all measurement wavelengths, with the reflector implementation generating a higher radiance than the non-reflector implementation.

Figure 7B:
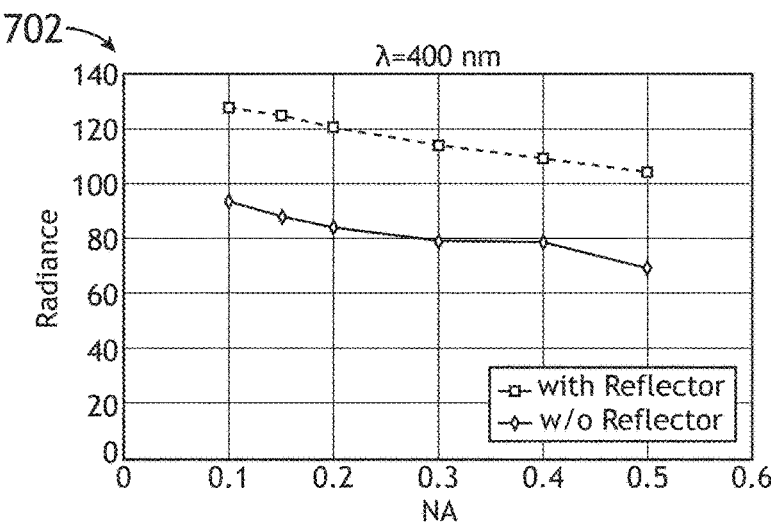
FIG. 7B illustrates a graph depicting radiance data as a function of NA obtained using a 400 nm pump laser with a reflector and without a reflector, in accordance with one or more embodiments of the present disclosure.
Figure 7C:
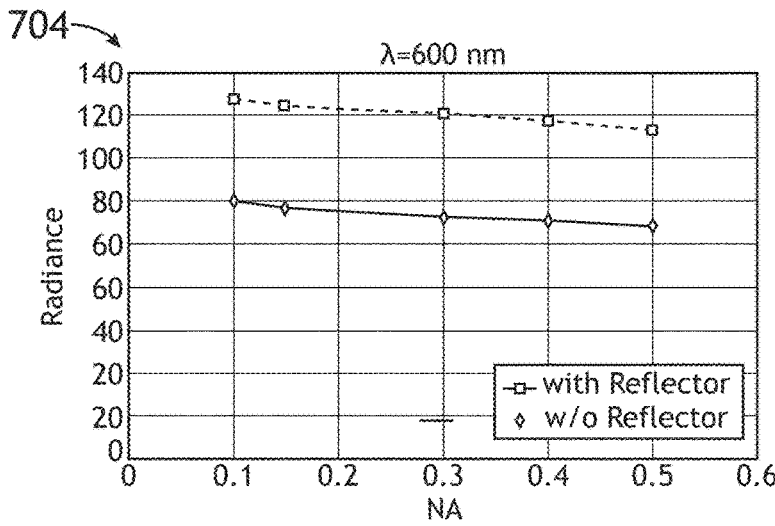
FIG. 7C illustrates a graph depicting radiance data as a function of NA obtained using a 600 nm pump laser with a reflector and without a reflector, in accordance with one or more embodiments of the present disclosure.
Figure 7D:
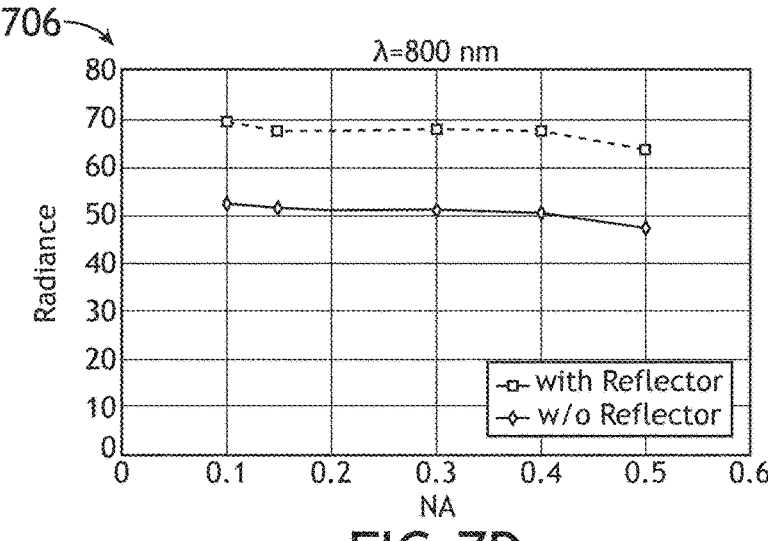
FIG. 7D illustrates a graph depicting radiance data as a function of NA obtained using a 800 nm pump laser with a reflector and without a reflector, in accordance with one or more embodiments of the present disclosure.

FIGS. 7B-7D illustrate a series of graphs 702, 704, and 706 depicting radiance data as function of NA for different wavelengths with and without a reflector, in accordance with one or more embodiments of the present disclosure. FIG. 7B shows graph 702 depicting radiance data as a function of NA obtained using a 400 nm pump laser with a reflector (squares) and without a reflector (diamonds). FIG. 7C shows graph 704 depicting radiance data as a function of NA obtained using a 600 nm pump laser with a reflector (squares) and without a reflector (diamonds). FIG. 7D shows graph 706 depicting radiance data as a function of NA obtained using a 800 nm pump laser with a reflector (squares) and without a reflector (diamonds). This observation shows that shorter wavelength pump lasers are more sensitive to changes in NA and also experience a large increase in radiance from the reflector (e.g., reflector 602).

Figure 7E:
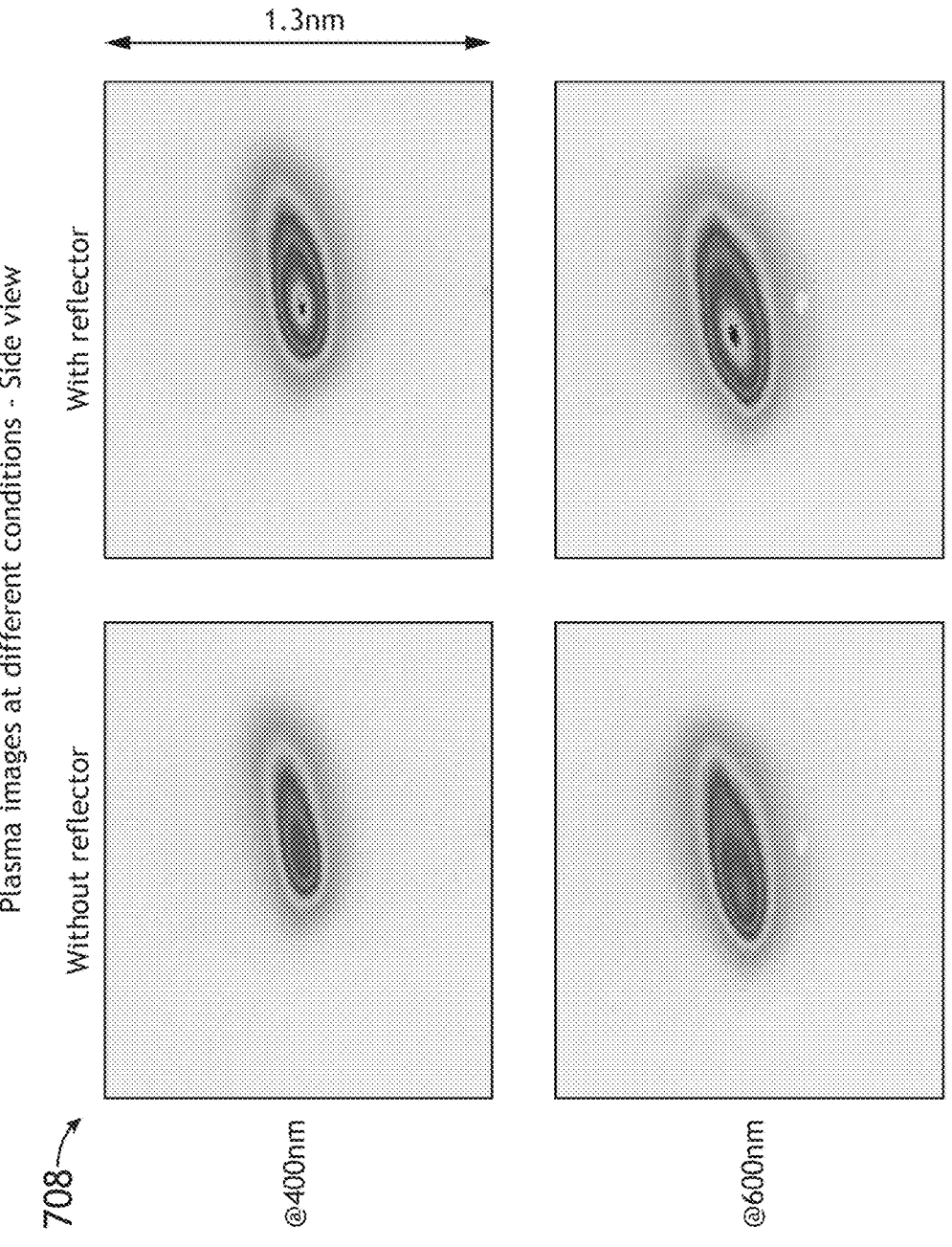
FIG. 7E illustrates side views of plasma images obtained under different conditions, in accordance with one or more embodiments of the present disclosure.

FIG. 7E illustrates side views of plasma images 708 obtained under different conditions. The series of images 708 obtained under different conditions include a side view plasma image obtained with a 400 nm pump laser without a reflector; a side view plasma image obtained with a 400 nm pump laser with a reflector; a side view plasma image obtained with a 600 nm pump laser obtained without a reflector; and a side view plasma image obtained with a 600 nm pump laser with a reflector.

Figure 7F:
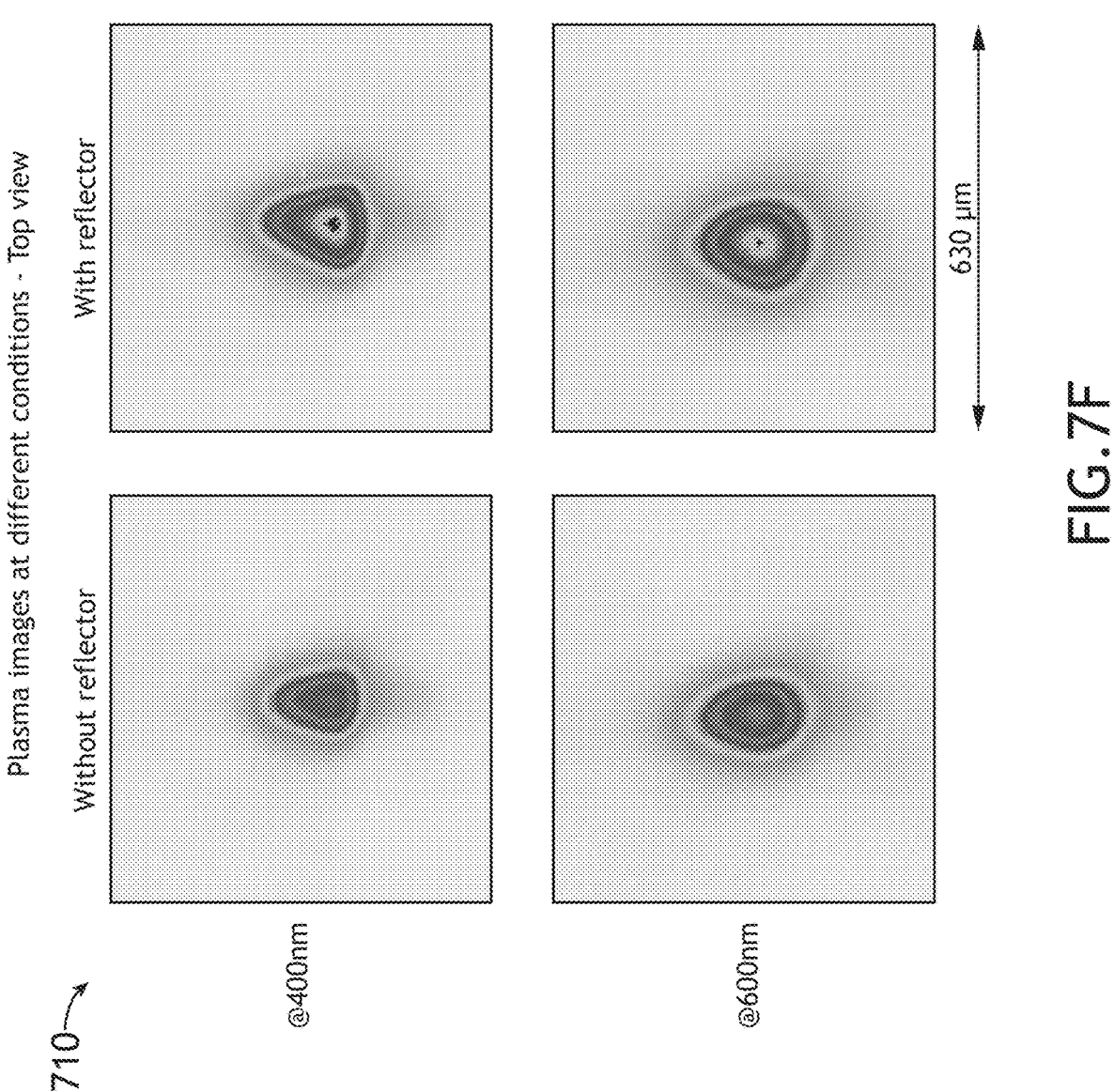
FIG. 7F illustrates top views of plasma images obtained under different conditions, in accordance with one or more embodiments of the present disclosure.

FIG. 7F illustrates top views of plasma images 710 obtained under different conditions. The series of images 710 obtained under different conditions include a top view plasma image obtained with a 400 nm pump laser without a reflector; a top view plasma image obtained with a 400 nm pump laser with a reflector; a top view plasma image obtained with a 600 nm pump laser obtained without a reflector; and a top view plasma image obtained with a 600 nm pump laser with a reflector.

Figure 7G:
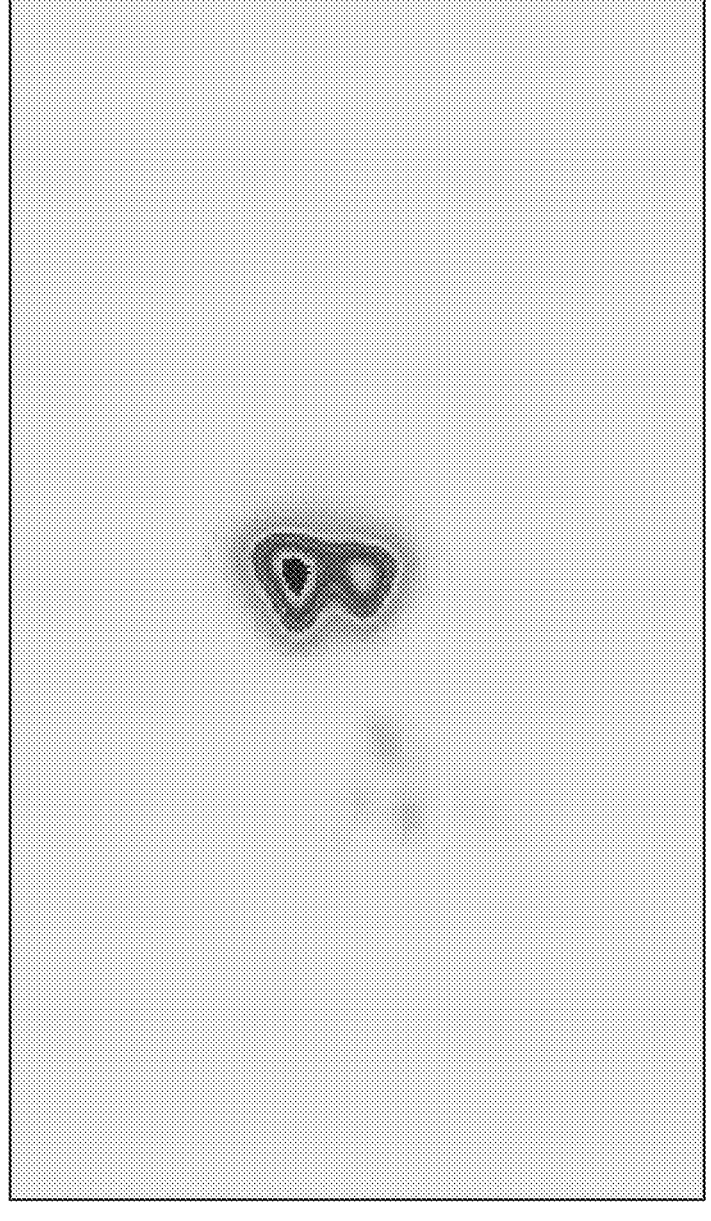
FIG. 7G illustrates an image obtained from a plasma where an optical grating was placed within the laser path to the plasma region, in accordance with one or more embodiments of the present disclosure.

FIG. 7G illustrates an image 712 obtained from a plasma where an optical grating was placed within the laser path to the plasma region. In this case, a plasma was shown to be generated when uneven power was present in two grating orders.

Figure 8A:
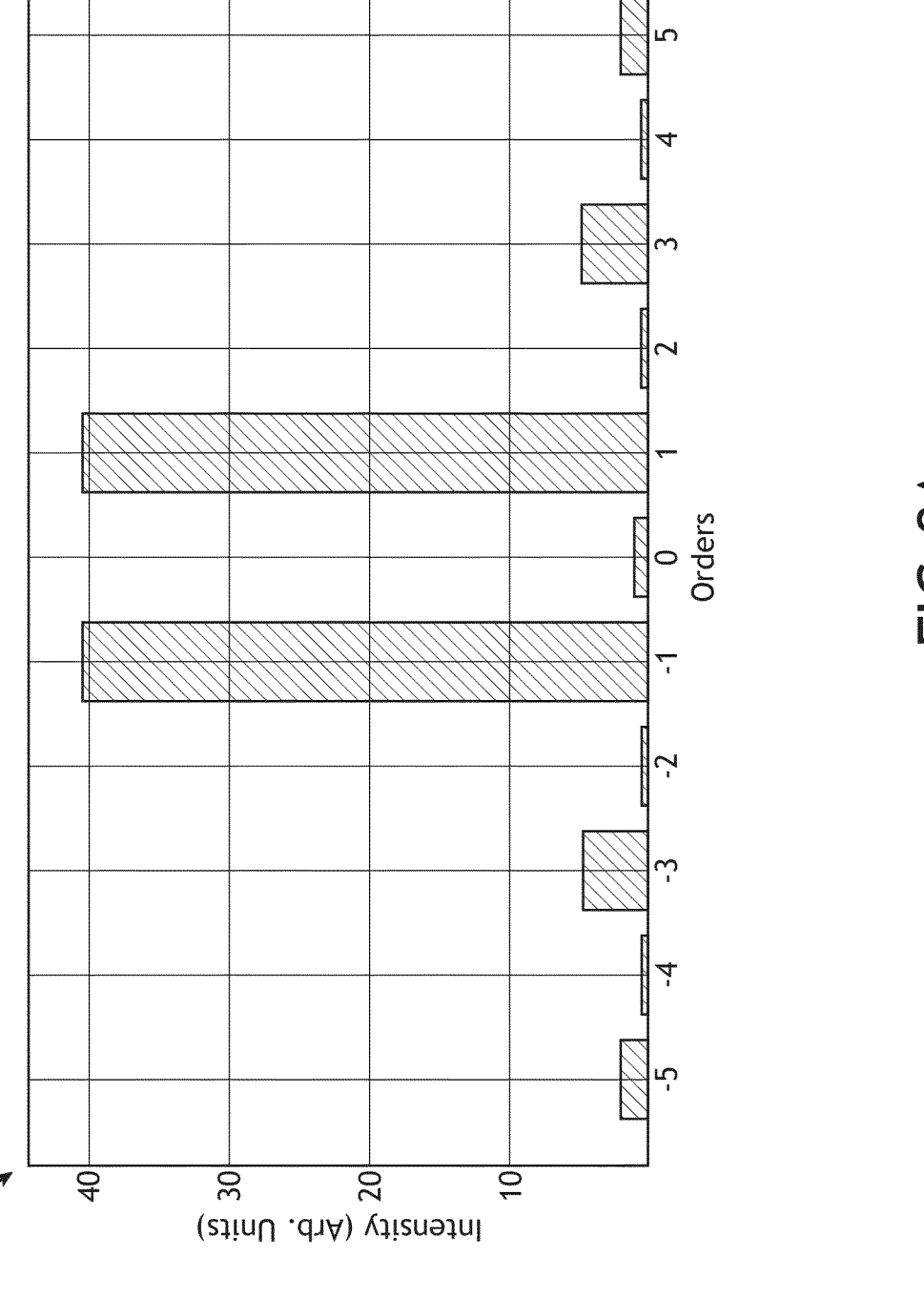
FIG. 8A illustrates a conceptual view of the intensity of grating orders of a plasma pump beam after the primary beam undergoes diffraction at a beam splitting device, in accordance with one or more embodiments of the present disclosure.

FIG. 8A illustrates a conceptual view of the intensity of grating orders of a plasma pump beam after the primary beam undergoes diffraction at a beam splitting device. In this example, the intensity of the total light is distributed amongst the diffracted orders as follows: +/−1 orders have 39.5%; +/−3 orders have 4.5%; +/−orders have 1.6%; $0^{th}$ order has 1%.

Figure 8B:
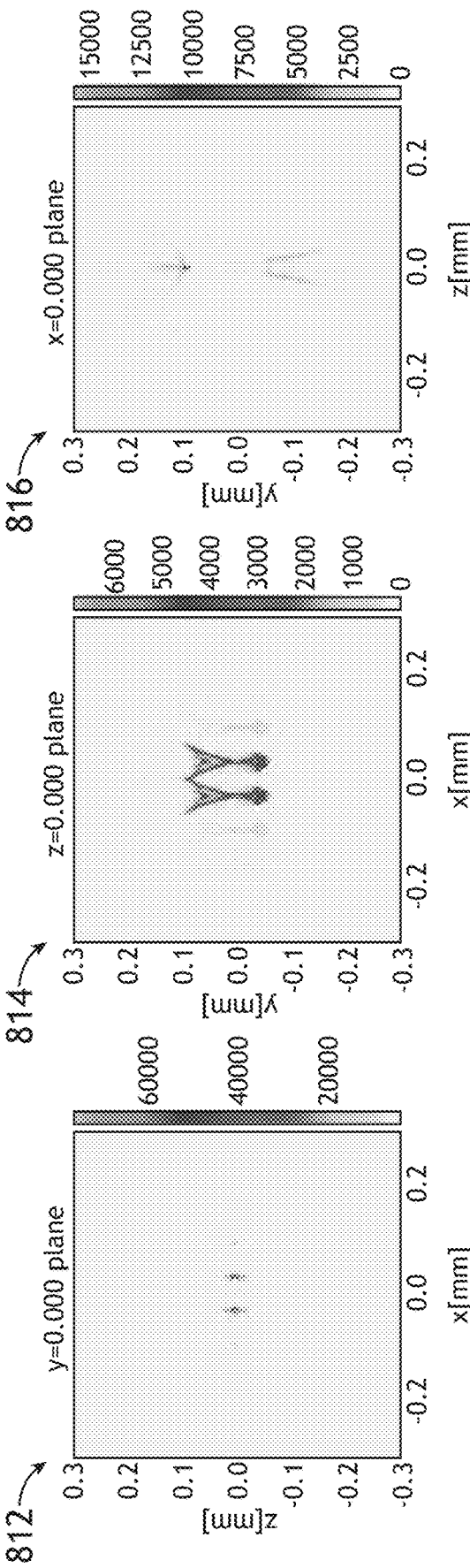
FIG. 8B illustrates the power distribution of the plasma at different focal planes, in accordance with one or more embodiments of the present disclosure, in accordance with one or more embodiments of the present disclosure.

FIG. 8B illustrates the power distribution of the plasma at different focal planes, in accordance with one or more embodiments of the present disclosure. Image 812 depicts the power distribution in the Y-plane. Image 814 depicts the power distribution in the Z-plane. Image 816 depicts the power distribution in the X-plane.

Figure 8C:
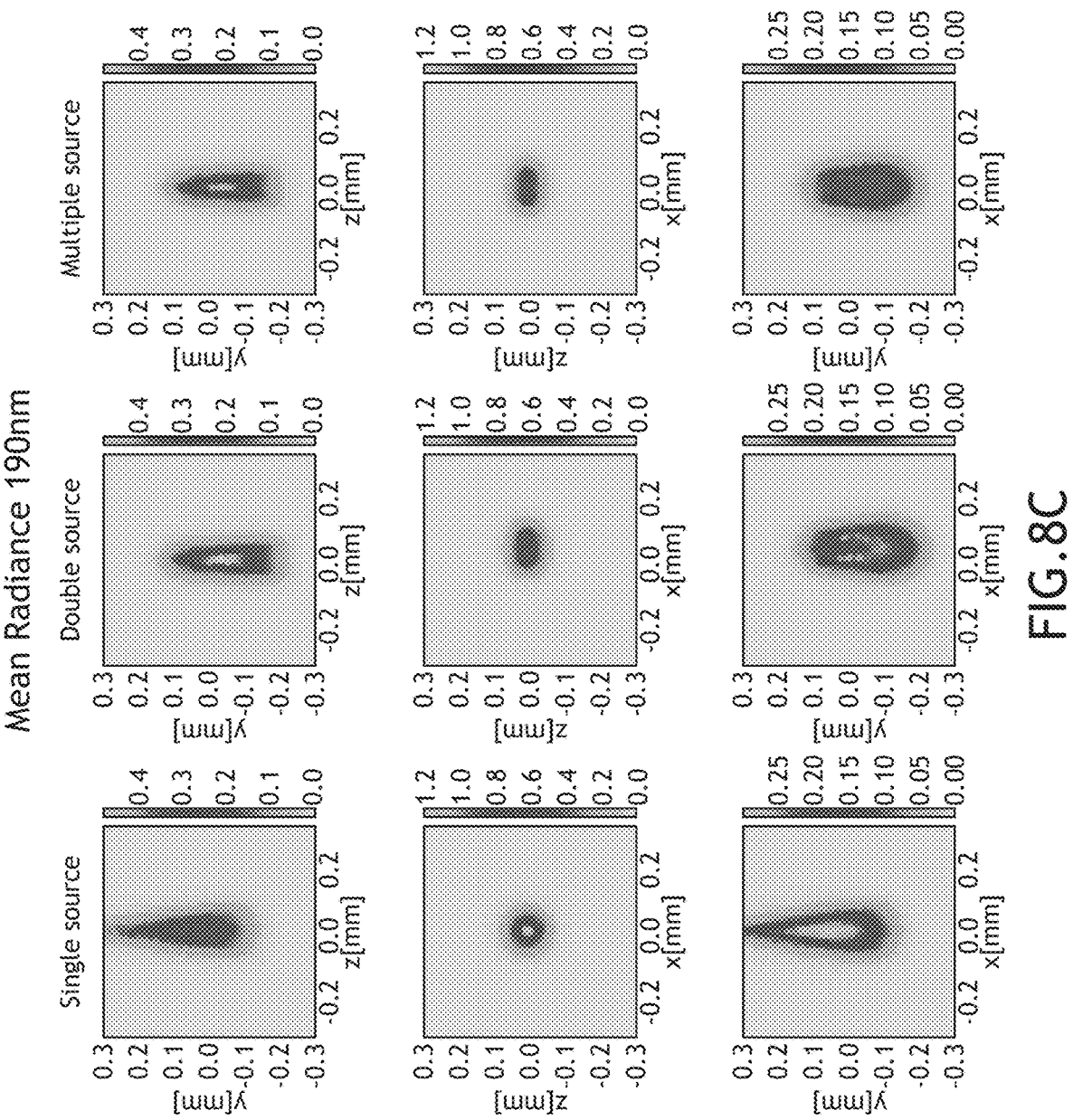
FIG. 8C depicts the mean radiance at the X-plane, Y-plane, and Z-plane for a single source, a double source, and a multiple source obtained with a 190 nm pump laser operating at a power level of 180 W, in accordance with one or more embodiments of the present disclosure.
Figure 8D:
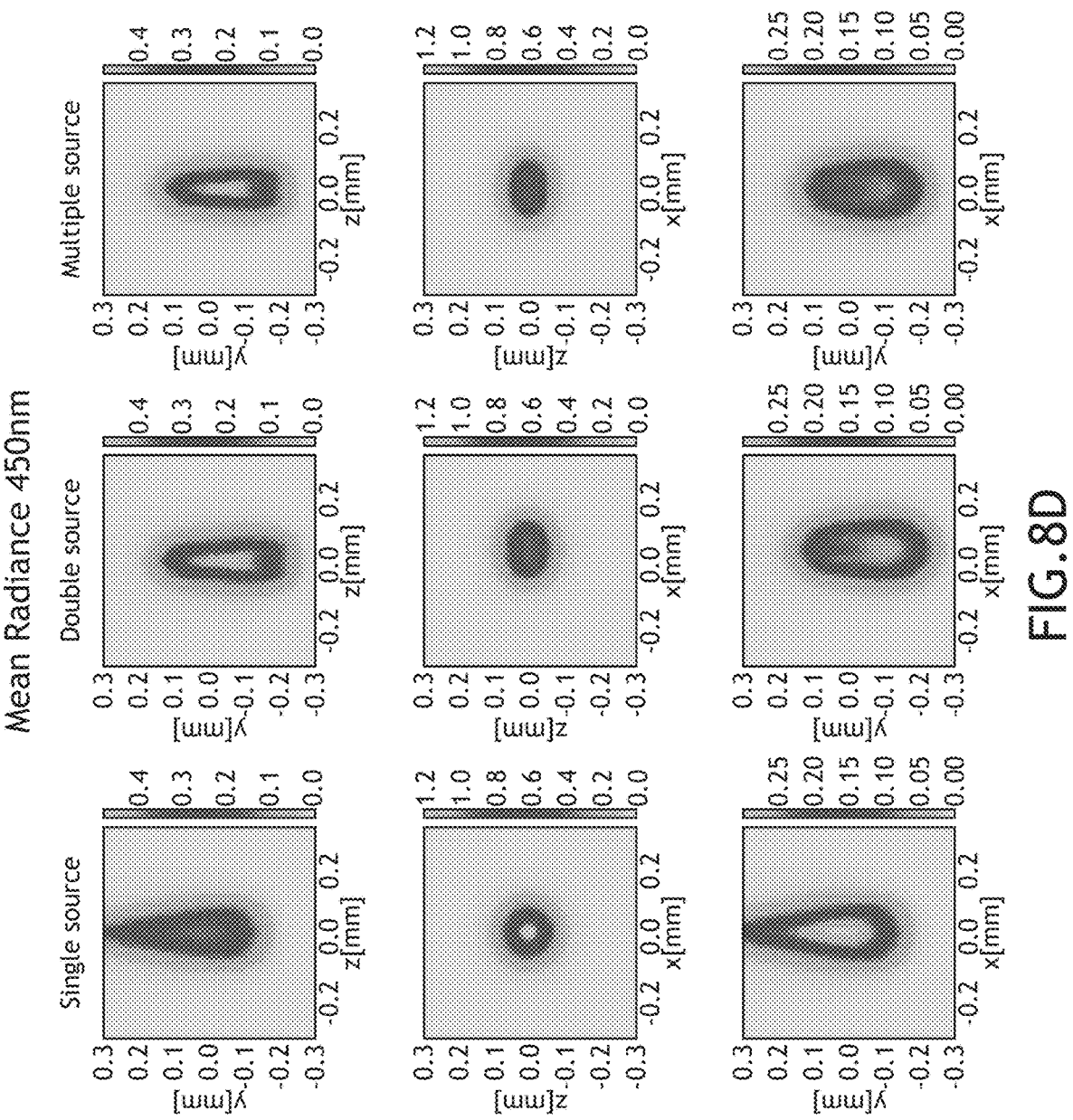
FIG. 8D depicts the mean radiance at the X-plane, Y-plane, and Z-plane for a single source, a double source, and a multiple source obtained with a 450 nm pump laser operating at a power level of 180 W.

FIGS. 8C and 8D illustrate the mean radiance of the plasma at different focal planes for different wavelength pump lasers for single, double, and multiple sources, in accordance with one or more embodiments of the present disclosure. FIG. 8C depicts the mean radiance a the X-plane (top row), Y-plane (middle row), and Z-plane (bottom row) for a single source, a double source (two plasma spots), and a multiple source (three or more plasma spots) obtained with a 190 nm pump laser operating at a power level of 180 W. FIG. 8D depicts the mean radiance a the X-plane (top row), Y-plane (middle row), and Z-plane (bottom row) for a single source, a double source (two plasma spots), and a multiple source (three or more plasma spots) obtained with a 450 nm pump laser operating at a power level of 180 W.

Figure 8E:
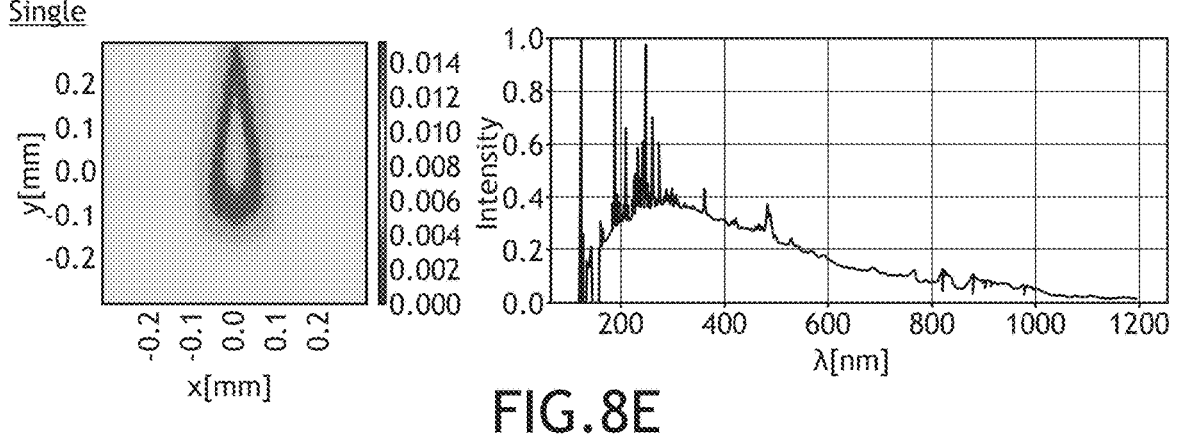
FIG. 8E depicts the plasma spectrum obtained along the x-axis at the maximum of the plasma for a single source plasma.
Figure 8F:
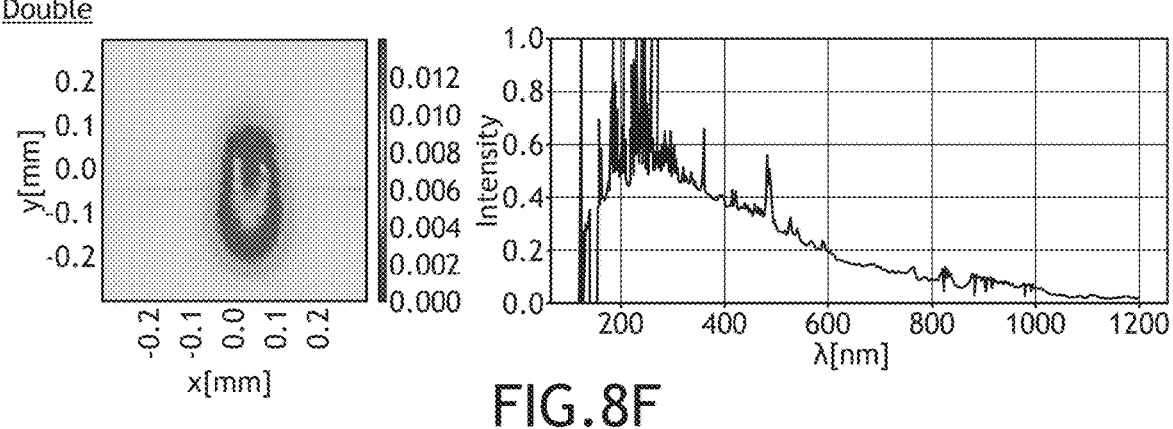
FIG. 8F depicts the plasma spectrum obtained along the x-axis at the maximum of the plasma for a double source plasma.
Figure 8G:
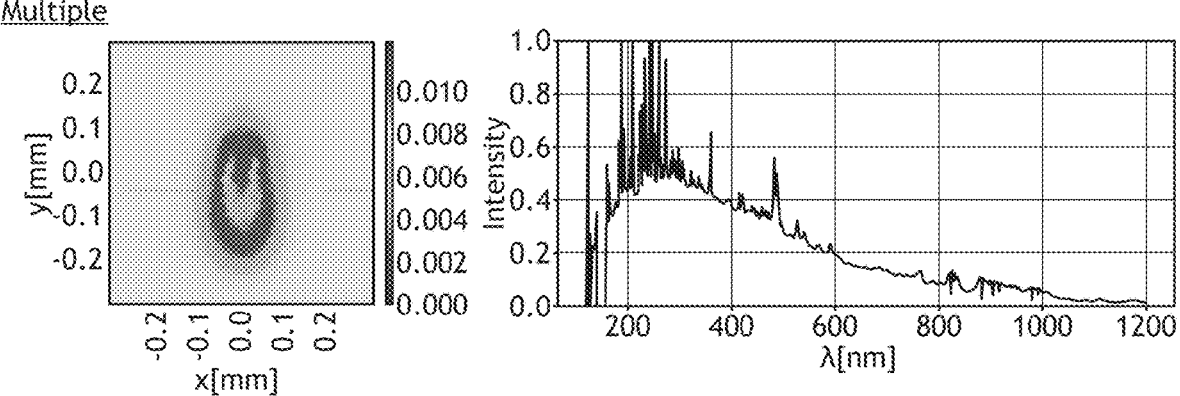
FIG. 8G depicts the plasma spectrum obtained along the x-axis at the maximum of the plasma for a multiple source plasma.

FIGS. 8E-8G illustrate the spectral radiance as a function of wavelength corresponding with the images of the Z-plane for the single, double, and multiple sources depicted in FIG. 8C. FIG. 8E depicts the plasma spectrum obtained along the x-axis at the maximum of the plasma (as noted by the dotted line) for a single source plasma. The intensity of the plasma is shown as a function of wavelength for the plasma for a 450 nm pump laser. FIG. 8F depicts the plasma spectrum obtained along the x-axis at the maximum of the plasma (as noted by the dotted line) for a double source plasma. The intensity of the double source plasma is shown as a function of wavelength for the plasma for a 450 nm pump laser. FIG. 8G depicts the plasma spectrum obtained along the x-axis at the maximum of the plasma (as noted by the dotted line) for a multiple source plasma. The intensity of the multiple source plasma is shown as a function of wavelength for the plasma for a 450 nm pump laser.

Figure 8H:
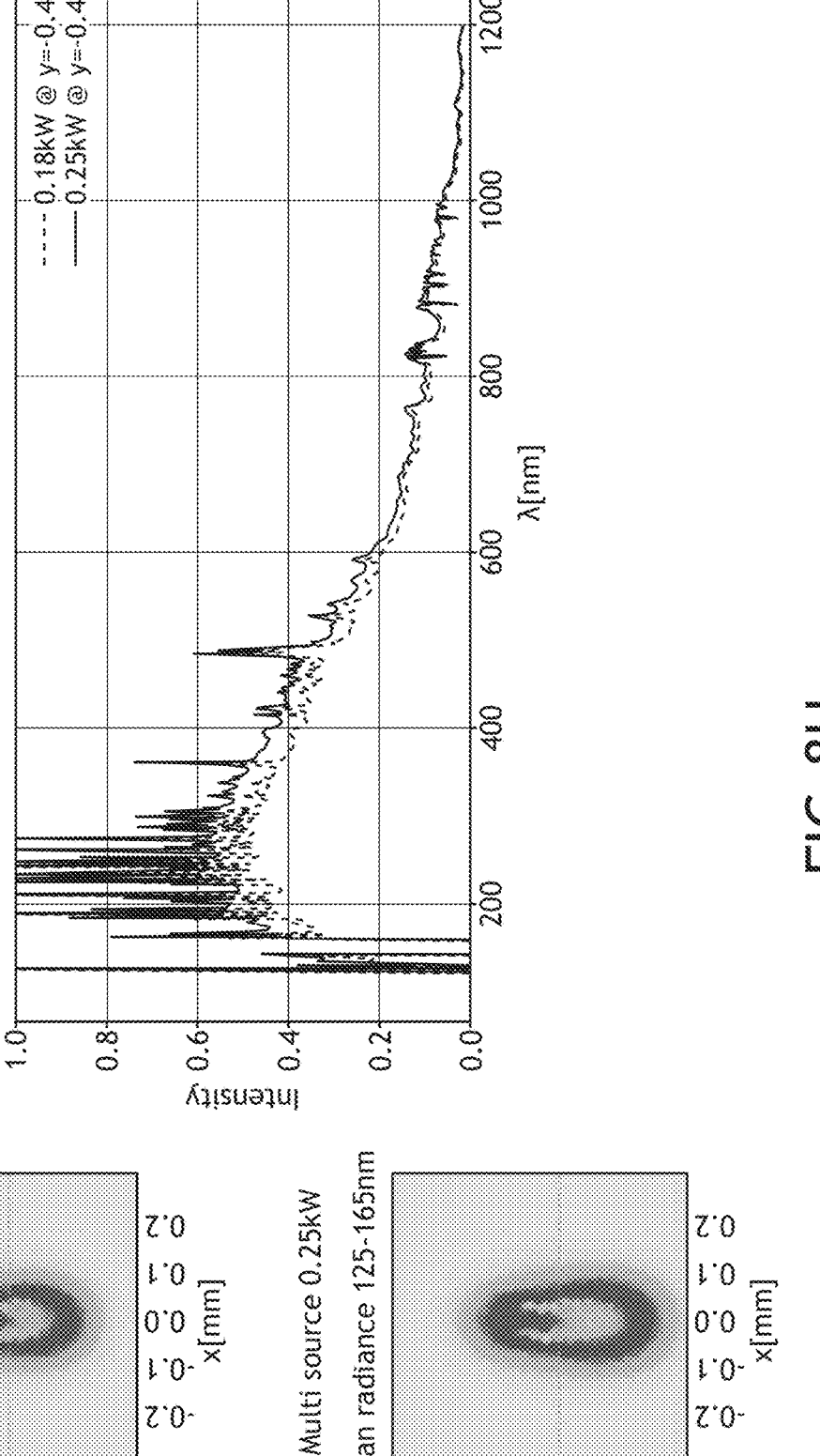
FIG. 8H illustrates a comparison of the mean radiance in the Z-plane for a multiple source plasma generated with 0.18 KW and 0.25 KW pump laser.

FIG. 8H illustrates a comparison of the mean radiance in the Z-plane for a multiple source plasma generated with 0.18 KW and 0.25 KW pump laser. In addition, FIG. H depicts a comparison of the plasma spectrum showing the intensity of the plasma as a function of wavelength for a 0.18 KW pump laser and 0.25 KW pump laser.

Figure 9:
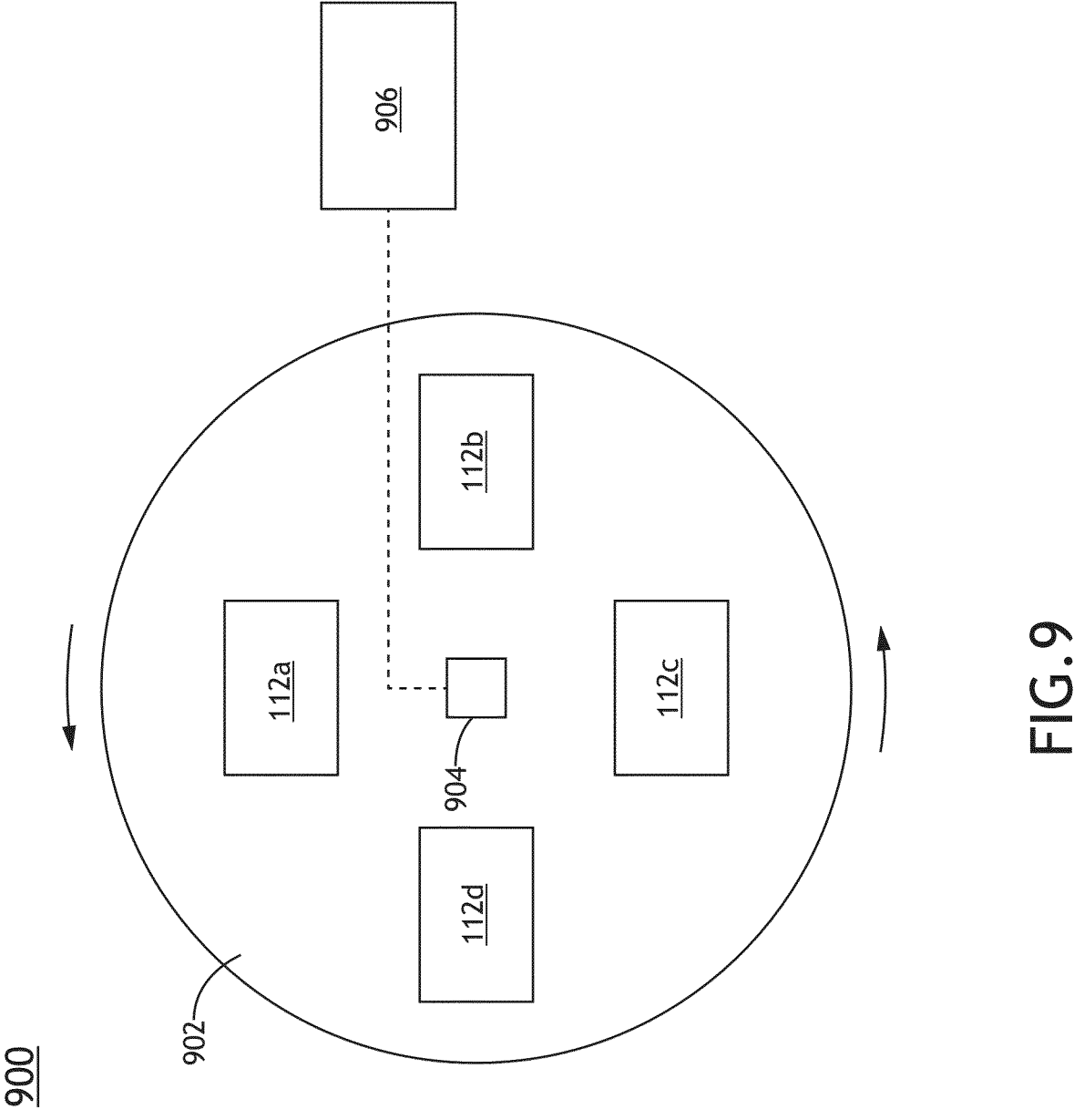
FIG. 9 illustrates a conceptual view of an adjustable platform including a rotatable wheel securing a set of beamsplitters, in accordance with one or more embodiments of the present disclosure.

In embodiments, the beamsplitter 112 is replaceable. For example, the system 100 may include a beamsplitter 112 secured on an adjustable platform such as, but not limited to, a rotatable wheel or other translatable surface. FIG. 9 illustrates a conceptual view of an adjustable platform 900 including a rotatable wheel 902 securing a set of beamsplitters 112a, 112b, 112c, and 112d. In embodiments, the platform 900 includes a motor 904 and a controller 906 (e.g., processor(s) and memory). The controller 906 may selectively operate the motor 904 in order to selectively rotate the rotatable wheel 902 to position the desired beamsplitter (e.g., 112a, 112b, 112c, or 112d) within the beam path to split the collimated beam 108. In this regard, the plasma shape of the plasma can also be adopted to different use cases by switching between the different beamsplitters within the pump beam path of the light source 100. In this way, the etendue of the light source may be optimized to the desired application or measurement scenario. It is noted that the scope of the present disclosure is not limited to a rotatable wheel as any number of configurations may be used to provide for the exchangeability of different beamsplitters within the pump beam path. For example, the adjustable platform may include a linear platform that is translated linearly from one beamsplitter to the next via a linear motor/actuator. By way of another example, the adjustable platform may include an array of beamsplitters, and the adjustable platform may include an X-Y actuator to allow for translation of the array in two orthogonal directions to allow for the selective placement of a particular beamsplitter within the array into the pump beam path.

In embodiments, the beamsplitter 112 is adjustable. In this example, the beamsplitter 112 is an adaptive beam-splitting device. For example, the beamsplitter 112 may include, but is not limited to, a flexible, switchable micro-mirror array. In this way, in a feedback loop, a controller may adjust the adaptive beamsplitter to stabilize the temporal fluctuations of the plasma shape and/or the plasma movement. For example, one or more detectors may monitor the plasma and transmit those signals to a controller. In turn, the controller may adjust one or more parameters of the adaptive beamsplitter to stabilize the temporal fluctuations of the plasma shape and/or the plasma movement.

Figure 10:
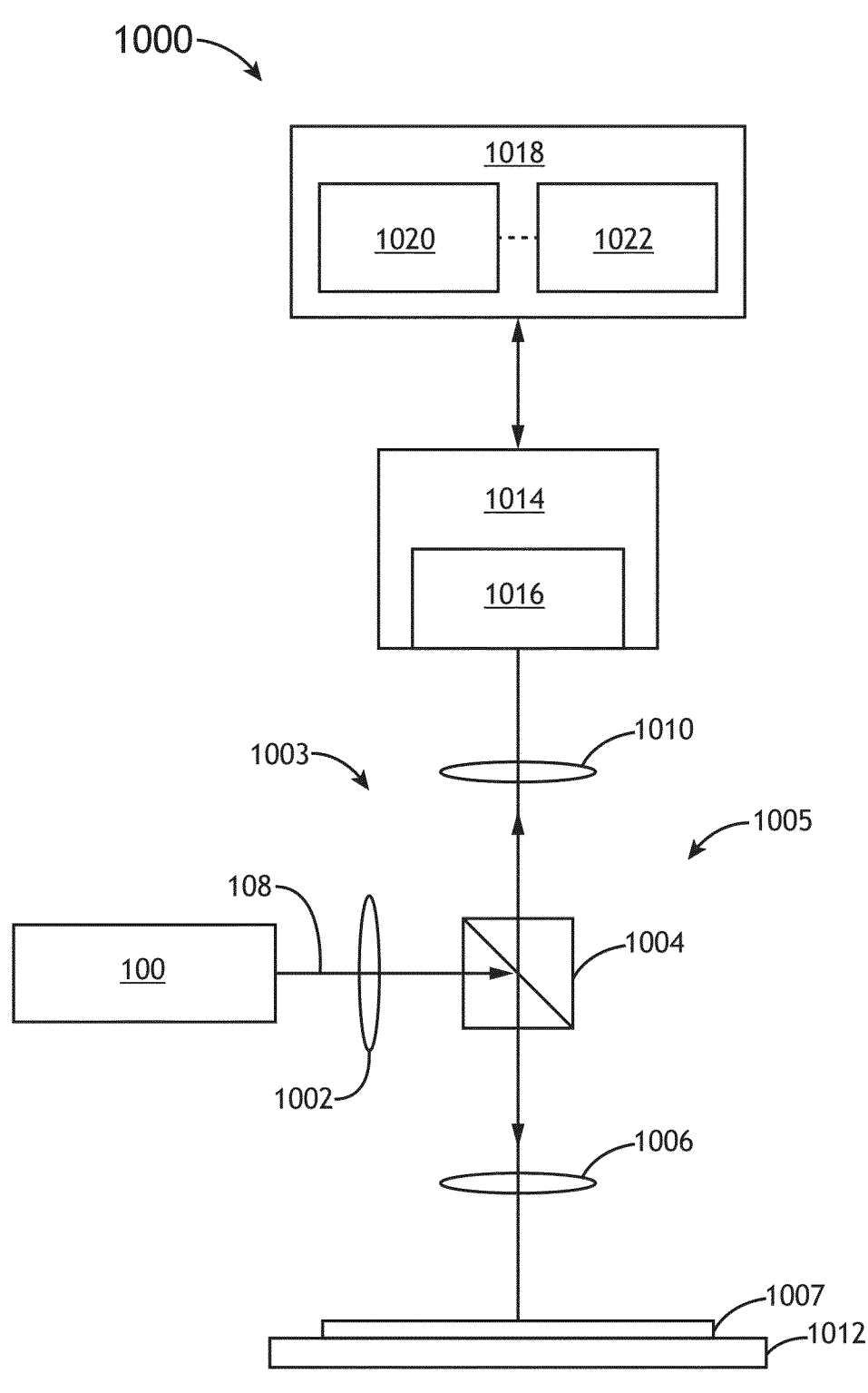
FIG. 10 illustrates a simplified schematic view of an optical system incorporating the LSP broadband light source, in accordance with one or more alternative and/or additional embodiments.

FIG. 10 illustrates a simplified schematic view of an optical system 1000 incorporating the LSP broadband light source 100, in accordance with one or more alternative and/or additional embodiments. In embodiments, system 1000 includes the LSP light source 100, an illumination arm 1003, a collection arm 1005, a detector assembly 1014, and a controller 1018 including one or more processors 1020 and memory 1022.

It is noted herein that system 1000 may comprise any imaging, inspection, metrology, lithography, or other characterization system known in the art. In this regard, system 1000 may be configured to perform inspection, optical metrology, lithography, and/or any form of imaging on a sample 1007. Sample 1007 may include any sample known in the art including, but not limited to, a wafer, a reticle, a photomask, flat panel display, and the like. It is noted that system 1000 may incorporate one or more of the various embodiments of the LSP light source 100 described throughout the present disclosure.

In embodiments, sample 1007 is disposed on a stage assembly 1012 to facilitate movement of sample 1007. Stage assembly 1012 may include any stage assembly 1012 known in the art including, but not limited to, an X-Y stage, an R-θ stage, and the like. In another embodiment, stage assembly 1012 is capable of adjusting the height of sample 1007 during inspection or imaging to maintain focus on sample 1007.

In one embodiment, the illumination arm 1003 is configured to direct broadband light 124 from the broadband LSP light source 100 to the sample 1007. The illumination arm 1003 may include any number and type of optical components known in the art. In one embodiment, the illumination arm 1003 includes one or more optical elements 1002, a beam splitter 1004, and an objective lens 1006. In this regard, illumination arm 1003 may be configured to focus broadband light 124 from the broadband LSP light source 100 onto the surface of the sample 1007. The one or more optical elements 1002 may include any optical element or combination of optical elements known in the art including, but not limited to, one or more mirrors, one or more lenses, one or more polarizers, one or more gratings, one or more filters, one or more beam splitters, and the like. It is noted herein that the collection location may include, but is not limited to, one or more of the optical elements 1002, a beam splitter 1004, or an objective lens 1006.

In embodiments, system 1000 includes a collection arm 1005 configured to collect light reflected, scattered, diffracted, and/or emitted from sample 1007. In another embodiment, collection arm 1005 may direct and/or focus the light from the sample 1007 to a sensor 1016 of a detector assembly 1014. It is noted that sensor 1016 and detector assembly 1014 may include any sensor and detector assembly known in the art. The sensor 1016 may include, but is not limited to, a CCD sensor or a CCD-TDI sensor. Further, sensor 1016 may include, but is not limited to, a line sensor or an electron-bombardment line sensor.

In one embodiment, detector assembly 1014 is communicatively coupled to a controller 1018 including one or more processors 1020 and memory 1022. For example, the one or more processors 1020 may be communicatively coupled to memory 1022, wherein the one or more processors 1020 are configured to execute a set of program instructions stored on memory 1022. In one embodiment, the one or more processors 1020 are configured to analyze the output of detector assembly 1014. In one embodiment, the set of program instructions are configured to cause the one or more processors 1020 to analyze one or more characteristics of sample 1007. In another embodiment, the set of program instructions are configured to cause the one or more processors 1020 to modify one or more character-istics of system 1000 in order to maintain focus on the sample 1007 and/or the sensor 1016. For example, the one or more processors 1020 may be configured to adjust the objective lens 1006 or one or more optical elements 1002 in order to focus broadband light 124 from broadband LSP light source 100 onto the surface of the sample 1007. By way of another example, the one or more processors 1020 may be configured to adjust the objective lens 1006 and/or one or more optical elements 1010 in order to collect illumination from the surface of the sample 1007 and focus the collected illumination on the sensor 1016.

It is noted that the system 1000 may be configured in any optical configuration known in the art including, but not limited to, a dark-field configuration, a bright-field orienta-tion, and the like. The system 1000 may be configured as any type of metrology tool known in the art such as, but not limited to, a spectroscopic ellipsometer with one or more angles of illumination, a spectroscopic ellipsometer for measuring Mueller matrix elements (e.g., using rotating compensators), a single-wavelength ellipsometer, an angle-resolved ellipsometer (e.g., a beam-profile ellipsometer), a spectroscopic reflectometer, a single-wavelength reflecto-meter, an angle-resolved reflectometer (e.g., a beam-profile reflectometer), an imaging system, a pupil imaging system, a spectral imaging system, or a scatterometer.

Additional details of various embodiments of optical characterization system 1000 are described in U.S. Pub-lished U.S. Pat. No. 7,957,066B2, entitled "Split Field Inspection System Using Small Catadioptric Objectives," issued on Jun. 7, 2011; U.S. Published Patent Application 2007/0002465, entitled "Beam Delivery System for Laser Dark-Field Illumination in a Catadioptric Optical System," published on Jan. 4, 2007; U.S. Pat. No. 5,999,310, entitled "Ultra-broadband UV Microscope Imaging System with Wide Range Zoom Capability," issued on Dec. 7, 1999; U.S. Pat. No. 7,525,649 entitled "Surface Inspection System Using Laser Line Illumination with Two Dimensional Imag-ing," issued on Apr. 28, 2009; U.S. Published Patent Appli-cation 2013/0114085, entitled "Dynamically Adjustable Semiconductor Metrology System," by Wang et al. and published on May 9, 2013; U.S. Pat. No. 5,608,526, entitled "Focused Beam Spectroscopic Ellipsometry Method and System, by Piwonka-Corle et al., issued on Mar. 4, 1997; and U.S. Pat. No. 6,297,880, entitled "Apparatus for Ana-lyzing Multi-Layer Thin Film Stacks on Semiconductors," by Rosencwaig et al., issued on Oct. 2, 2001, which are each incorporated herein by reference in their entirety.

The one or more processors 1020 of the present disclosure may include any one or more processing elements known in the art. In this sense, the one or more processors 1020 may include any microprocessor-type device configured to execute software algorithms and/or instructions. In one embodiment, the one or more processors 1020 may consist of a desktop computer, mainframe computer system, work-station, image computer, parallel processor, or other com-puter system (e.g., networked computer) configured to execute a program configured to operate the system 1000 and/or Broadband LSP light source 100, as described throughout the present disclosure. It should be recognized that the steps described throughout the present disclosure may be carried out by a single computer system or, alter-natively, multiple computer systems. In general, the term "processor" may be broadly defined to encompass any device having one or more processing elements, which execute program instructions from a non transitory memory medium 1022. Moreover, different subsystems of the vari-ous systems disclosed may include processor or logic ele-ments suitable for carrying out at least a portion of the steps described throughout the present disclosure. Therefore, the above description should not be interpreted as a limitation on the present disclosure but merely an illustration.

The memory medium 1022 may include any storage medium known in the art suitable for storing program instructions executable by the associated one or more pro-cessors 1020. For example, the memory medium 1022 may include a non-transitory memory medium. For instance, the memory medium 1022 may include, but is not limited to, a read-only memory, a random access memory, a magnetic or optical memory device (e.g., disk), a magnetic tape, a solid state drive, and the like. In another embodiment, the memory 1022 is configured to store one or more results and/or outputs of the various steps described herein. It is further noted that memory 1022 may be housed in a common controller housing with the one or more processors 1020. In an alternative embodiment, the memory 1022 may be located remotely with respect to the physical location of the processors 1020. For instance, the one or more processors 1020 may access a remote memory (e.g., server), accessible through a network (e.g., internet, intranet, and the like). In another embodiment, memory medium 1022 maintains pro-gram instructions for causing the one or more processors 1020 to carry out the various steps described through the present disclosure.

Figure 11:
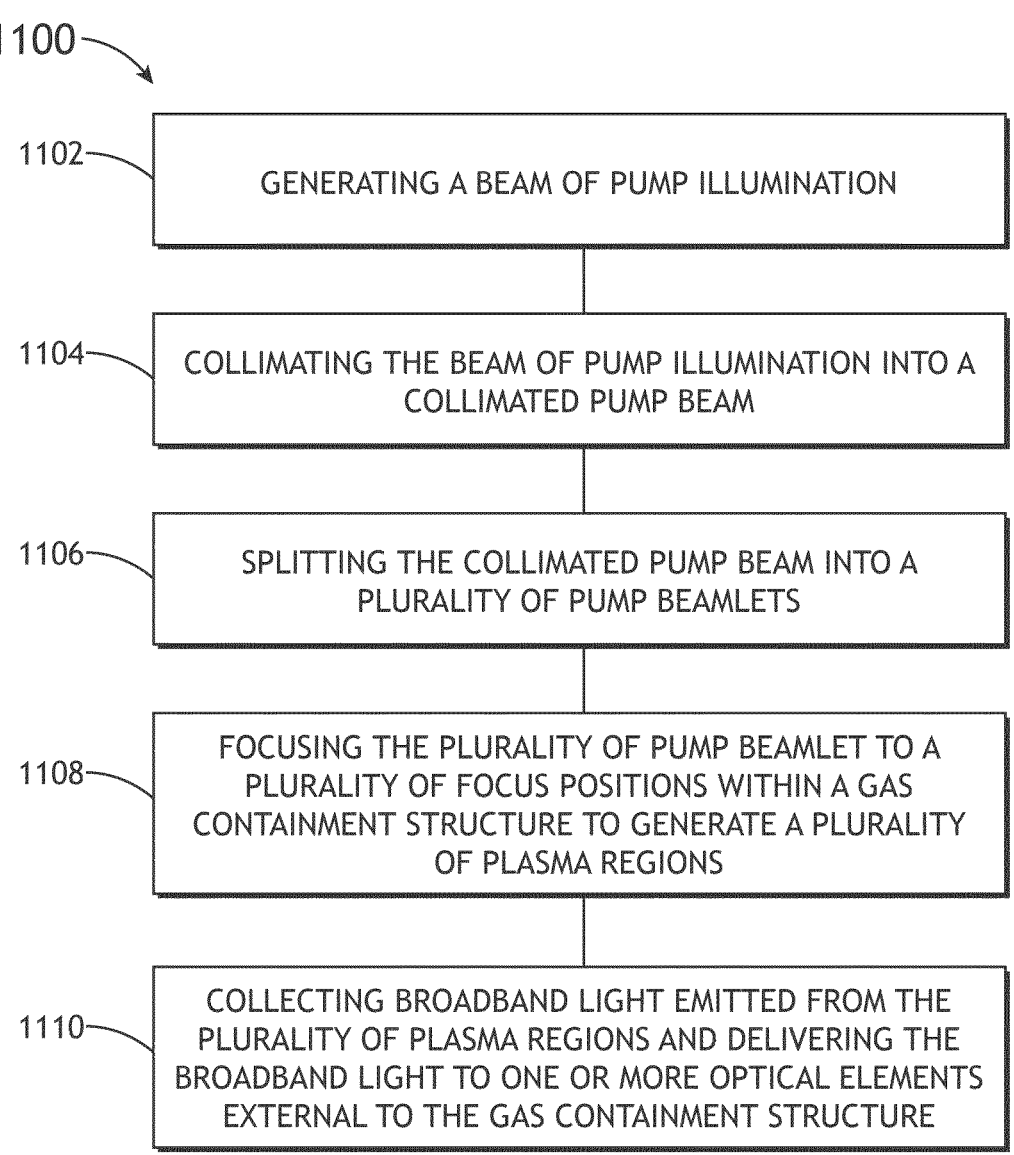
FIG. 11 illustrates a process flow diagram depicting a method of generating LSP broadband light, in accordance with one or more embodiments of the present disclosure.

FIG. 11 illustrates a process flow diagram depicting a method 1100 of generating LSP broadband light, in accor-dance with one or more embodiments of the present disclo-sure. It is noted herein that the steps of method 1100 may be implemented all or in part by broadband LSP light source 100. It is further recognized, however, that the method 900 is not limited to the broadband LSP light source 100 in that additional or alternative system-level embodiments may carry out all or part of the steps of method 900.

In step 1102, method 1100 includes generating a beam of pump illumination. In step 1104, method 1100 includes collimating the beam of pump illumination into a collimated pump beam. In step 1106, method 1100 includes splitting the collimated pump beam into a plurality of pump beamlets with one or more beamsplitters. In step 1108, method 1100 includes focusing the plurality of pump beamlet to a plu-rality of focus positions within a gas contained within a gas containment structure to generate a plurality of plasma regions at different focus positions, wherein a respective plasma region is generated at a respective focus position. In step 1110, method 1100 includes collecting at least a portion of broadband light emitted from the plurality of plasma regions and delivering the portion of the broadband light to one or more optical elements external to the gas containment structure One skilled in the art will recognize that the herein described components, operations, devices, objects, and the discussion accompanying them are used as examples for the sake of conceptual clarity and that various configuration modifications are contemplated. Consequently, as used herein, the specific exemplars set forth and the accompany-ing discussion are intended to be representative of their more general classes. In general, use of any specific exemplar is intended to be representative of its class, and the non-inclusion of specific components (e.g., operations), devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like).

In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

The invention claimed is:

1. A broadband light source comprising:
a pump source configured to generate a pump beam;
one or more collimating optical elements configured to collimate the pump beam into a collimated pump beam;
one or more focusing optical elements;
a beamsplitter located at a conjugate plane between the one or more collimating optical elements and the one or more focusing optical elements; and
a gas containment structure configured to contain a gas,
wherein the beamsplitter is configured to split the collimated pump beam into a plurality of pump beamlets,
wherein the one or more focusing optical elements are configured to focus the plurality of pump beamlets to a plurality of different focus positions within the gas to generate a plurality of plasma regions at the different focus positions, wherein a respective plasma region is generated at a respective focus position.

2. The broadband light source of claim 1, further comprising a light collector element configured to collect at least a portion of broadband light emitted from a plasma formed by the plurality of plasma regions.

3. The broadband light source of claim 1, wherein the beamsplitter comprises a diffractive beamsplitter.

4. The broadband light source of claim 3, wherein the plurality of pump beamlets correspond to a plurality of diffraction orders generated by the diffractive beamsplitter.

5. The broadband light source of claim 1, wherein the beamsplitter comprises a refractive beamsplitter or a reflective beamsplitter.

6. The broadband light source of claim 5, wherein the refractive beamsplitter comprises an adaptive micro-lens array.

7. The broadband light source of claim 6, wherein the adaptive micro-lens array is adjustable to stabilize temporal fluctuations of a shape or motion of a plasma formed by the plurality of plasma regions.

8. The broadband light source of claim 5, wherein the reflective beamsplitter comprises an adaptive micro-mirror array.

9. The broadband light source of claim 8, wherein the adaptive micro-mirror array is adjustable to stabilize temporal fluctuations of a shape or motion of the plasma.

10. The broadband light source of claim 1, wherein the pump beamlets have a same intensity.

11. The broadband light source of claim 1, wherein at least two of the pump beamlets have different intensities.

12. The broadband light source of claim 1, wherein at least one of a plurality of positions of the plurality of pump beamlets or a plurality of intensities of the pump beamlets are selected for a selected application.

13. The broadband light source of claim 12, wherein at least one of the plurality of intensities associated with the plurality of pump beamlets or the plurality of positions of the plurality of beamlets are adjustable by the beamsplitter.

14. The broadband light source of claim 1, wherein the beamsplitter is adjustable.

15. The broadband light source of claim 1, wherein the beamsplitter is replaceable.

16. The broadband light source of claim 1, wherein the beamsplitter comprises a plurality of beamsplitters secured on an adjustable platform.

17. The broadband light source of claim 16, wherein the adjustable platform comprises a rotatable wheel, wherein the plurality of beamsplitters are secured on the rotatable wheel.

18. The broadband light source of claim 17, wherein the rotatable wheel is controllable by a controller.

19. The broadband light source of claim 1, further comprising one or more collection optical elements configured to collect unabsorbed pump illumination and redirect the unabsorbed pump illumination into the gas to generate one or more additional plasma regions.

20. The broadband light source of claim 19, wherein the one or more collection optical elements comprises a mirror.

21. The broadband light source of claim 20, wherein the mirror comprises a microstructure mirror, wherein the microstructure mirror is configured to generate two or more orders of light within the gas containment structure.

22. The broadband light source of claim 20, wherein the mirror comprises a microstructure mirror, wherein the microstructure mirror is configured to apply a beam-shaping function to light reflected into the gas containment structure.

23. The broadband light source of claim 1, wherein the gas containment structure comprises at least one of a bulb, a cell, or a chamber.

24. A characterization system comprising:
a laser-sustained broadband light source comprising:
    a pump source configured to generate a pump beam;
    one or more collimating optical elements configured to collimate the pump beam into a collimated pump beam;
    one or more focusing optical elements;
    a beamsplitter located at a conjugate plane between the one or more collimating optical elements and the one or more focusing optical elements; and
    a gas containment structure configured to contain a gas, wherein the beamsplitter is configured to split the collimated pump beam into a plurality of pump beamlets,
    wherein the one or more focusing optical elements are configured to focus the plurality of pump beamlets to a plurality of different focus positions within the gas to generate a plurality of plasma regions at the different focus positions, wherein a respective plasma region is generated at a respective focus position; and
    a light collector element configured to collect at least a portion of broadband light emitted from the plasma;
a set of illuminator optics configured to direct the broadband light from the light collector element to one or more samples;
a detector assembly; and
a set of projection optics configured to receive illumination from a surface of the one or more samples and direct the illumination from the one or more samples to the detector assembly.

25. A method comprising:
generating a beam of pump illumination;
collimating the beam of pump illumination into a collimated pump beam;
splitting the collimated pump beam into a plurality of pump beamlets with one or more beamsplitters;
focusing the plurality of pump beamlet to a plurality of focus positions within a gas contained within a gas containment structure to generate a plurality of plasma regions at different focus positions, wherein a respective plasma region is generated at a respective focus position; and
collecting at least a portion of broadband light emitted from the plurality of plasma regions and delivering the portion of the broadband light to one or more optical elements external to the gas containment structure.

26. A broadband light source comprising:
a pump source configured to generate a pump beam;
one or more collimating optical elements configured to collimate the pump beam into a collimated pump beam;
one or more focusing optical elements;
a beam-shaper located at a conjugate plane between the one or more collimating optical elements and the one or more focusing optical elements; and
a gas containment structure configured to contain a gas,
wherein the beam-shaper is configured to condition the collimated pump beam to generate a smooth intensity distribution within the gas containment structure.

27. The broadband light source of claim 26, wherein the beam-shaper comprises a diffractive beam-shaper.

28. The broadband light source of claim 27, wherein the diffractive beam-shaper comprises a diffractive optical element (DOE).

29. The broadband light source of claim 26, wherein the beam-shaper comprises a reflective beam-shaper.

* * * * *